United States Patent
Yuyama

(10) Patent No.: US 11,159,096 B2
(45) Date of Patent: Oct. 26, 2021

(54) POWER CONVERSION DEVICE

(71) Applicant: Mitsubishi Electric Corporation, Tokyo (JP)

(72) Inventor: Atsushi Yuyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 275 days.

(21) Appl. No.: 16/333,439

(22) PCT Filed: Mar. 27, 2017

(86) PCT No.: PCT/JP2017/012449
§ 371 (c)(1),
(2) Date: Mar. 14, 2019

(87) PCT Pub. No.: WO2018/078908
PCT Pub. Date: May 3, 2018

(65) Prior Publication Data
US 2019/0252999 A1     Aug. 15, 2019

(30) Foreign Application Priority Data
Oct. 31, 2016     (JP) .............................. JP2016-213079

(51) Int. Cl.
*H02M 1/08*     (2006.01)
*H02P 5/74*     (2006.01)
(Continued)

(52) U.S. Cl.
CPC ......... *H02M 7/53871* (2013.01); *H02M 1/08* (2013.01); *H02M 7/493* (2013.01);
(Continued)

(58) Field of Classification Search
CPC ........... H02M 1/08; H02M 2001/0054; H02M 3/155; H02M 7/493; H02M 7/53871;
(Continued)

(56) References Cited

U.S. PATENT DOCUMENTS

2004/0012353 A1     1/2004   Seima et al.
2010/0052583 A1     3/2010   Takamatsu et al.
(Continued)

FOREIGN PATENT DOCUMENTS

EP     2 450 222 A2     5/2012
JP     2004-242371 A    8/2004
(Continued)

OTHER PUBLICATIONS

Communication dated Sep. 24, 2019 from European Patent Office in counterpart EP Application No. 17865936.3.
(Continued)

*Primary Examiner* — Thai T Dinh
(74) *Attorney, Agent, or Firm* — Sughrue Mion, PLLC; Richard C. Turner

(57) ABSTRACT

To obtain a power conversion device capable of reducing a loss of the power conversion device to improve fuel efficiency and electricity efficiency of an electrically driven vehicle. Provided is a power conversion device (1), which is to be mounted to a vehicle (VCL) configured to travel by using a drive motor (M1) as a motive power source. The power conversion device (1) includes inverters (100, 200) each configured to control the drive motor (M1) by having a plurality of switching elements (Q101 to Q106, Q201 to Q206) subjected to switching control. In the power conversion device (1), each of the plurality of switching elements (Q101 to Q106, Q201 to Q206) is formed of a wide band gap semiconductor.

31 Claims, 29 Drawing Sheets

(51) Int. Cl.
*H02M 7/493* (2007.01)
*H02M 7/5387* (2007.01)
*H02M 7/5395* (2006.01)
*H02P 25/22* (2006.01)
*H02P 27/04* (2016.01)
*H02P 27/08* (2006.01)
*B60L 15/20* (2006.01)
*B60K 6/40* (2007.10)
*H02M 1/00* (2006.01)

(52) U.S. Cl.
CPC ............ *H02M 7/5395* (2013.01); *H02P 5/74* (2013.01); *H02P 25/22* (2013.01); *H02P 27/04* (2013.01); *H02P 27/085* (2013.01); *B60K 6/40* (2013.01); *B60L 15/20* (2013.01); *B60L 2210/10* (2013.01); *B60Y 2200/91* (2013.01); *B60Y 2200/92* (2013.01); *B60Y 2400/61* (2013.01); *H02M 1/0009* (2021.05); *H02M 1/0054* (2021.05)

(58) Field of Classification Search
CPC ...... H02M 7/5395; H02P 25/22; H02P 27/04; H02P 27/085; H02P 5/74
See application file for complete search history.

(56) References Cited

U.S. PATENT DOCUMENTS

| | | | | |
|---|---|---|---|---|
| 2010/0164416 A1* | 7/2010 | Yamada | ............... | H02P 27/085 318/400.13 |
| 2010/0185350 A1* | 7/2010 | Okamura | ............... | H02P 23/08 701/22 |
| 2010/0222953 A1* | 9/2010 | Tang | ............... | B60L 15/2036 701/22 |
| 2010/0250067 A1* | 9/2010 | Matsumura | ............ | H02P 21/16 701/41 |
| 2011/0057591 A1* | 3/2011 | Tagome | .................. | B60L 15/20 318/400.23 |
| 2013/0169206 A1 | 7/2013 | Suhama et al. | | |
| 2015/0210171 A1* | 7/2015 | King | ........................ | B60L 7/14 318/139 |
| 2016/0141997 A1 | 5/2016 | Duguey et al. | | |
| 2016/0248347 A1 | 8/2016 | Shinohara | | |
| 2016/0329856 A1* | 11/2016 | Shoda | .................... | H02P 27/085 |
| 2017/0019050 A1* | 1/2017 | Miyama | .................. | H02P 27/08 |
| 2019/0334456 A1* | 10/2019 | Kashima | ................. | H02M 7/48 |

FOREIGN PATENT DOCUMENTS

| | | |
|---|---|---|
| JP | 2005-160185 A | 6/2005 |
| JP | 4605274 B2 | 1/2011 |
| JP | 2014-068428 A | 4/2014 |
| JP | 2016-514945 A | 5/2016 |
| WO | 2011/155013 A1 | 12/2011 |
| WO | 2015/182659 A1 | 12/2015 |

OTHER PUBLICATIONS

International Search Report of PCT/JP2017/012449 dated May 16, 2017.

* cited by examiner

SYSTEM CONFIGURATION

POWER CONVERSION DEVICE

CROSS REFERENCE TO RELATED APPLICATIONS

This application is a National Stage of International Application No. PCT/JP2017/012449 filed Mar. 27, 2017, claiming priority based on Japanese Patent Application No. 2016-213079 filed Oct. 31, 2016.

TECHNICAL FIELD

The present invention relates to a power conversion device, which includes a plurality of power semiconductor elements, and is configured to convert electric power between a DC power supply and an AC drive motor.

BACKGROUND ART

In recent years, hybrid vehicles, plug-in hybrid vehicles, electric vehicles, fuel cell vehicles, and other such automobiles mounted with electric power trains have become widespread. In the following description, the hybrid vehicle is referred to as "HEV", the plug-in hybrid vehicle is referred to as "PHEV", the electric vehicle is referred to as "EV", and the fuel cell vehicle is referred to as "FCV". Further, in the following description, the automobile mounted with an electric power train is referred to as "electrically driven vehicle".

For those electrically driven vehicles, a motor for propelling the vehicle and a power conversion device for driving the motor are additionally mounted to a configuration of a related-art gasoline engine vehicle, and technology development for improving fuel efficiency and electricity efficiency is in progress. The fuel efficiency refers to a traveling distance per unit fuel amount, and the electricity efficiency refers to a traveling distance per unit amount of electric power.

In view of this, in order to reduce a motor loss, there is proposed a technology for setting a carrier frequency of the power conversion device so as to minimize a total loss obtained by adding the motor loss and a loss of the power conversion device (see, for example, Patent Literature 1).

CITATION LIST

Patent Literature

[PTL 1] JP 4605274 B2

SUMMARY OF INVENTION

Technical Problem

However, the technology described in Patent Literature 1 is a technology for driving the motor by switching a Si-IGBT element mounted to the power conversion device with a carrier frequency that minimizes a total loss obtained by adding a motor loss and a loss of a power conversion device, and improves fuel efficiency and electricity efficiency due to reduction in the total loss, but produces small effects. The Si-IGBT element refers to an insulated gate bipolar transistor (IGBT) using a silicon (Si) semiconductor element.

The present invention has been made in order to solve the above-mentioned problem, and has an object to obtain a power conversion device capable of reducing a loss of the power conversion device to improve fuel efficiency and electricity efficiency of an electrically driven vehicle.

Solution to Problem

According to one embodiment of the present invention, there is provided a power conversion device, which is to be mounted to a vehicle configured to travel by using a drive motor as a motive power source, the power conversion device including an inverter for the drive motor, which is configured to control the drive motor by having a plurality of power semiconductor elements subjected to switching control, wherein each of the plurality of power semiconductor elements that form the inverter for the drive motor is formed of a wide band gap semiconductor.

Advantageous Effects of Invention

The power conversion device according to one embodiment of the present invention includes the inverter for the drive motor, which is configured to control the drive motor by having the plurality of power semiconductor elements subjected to the switching control, and each of the plurality of power semiconductor elements that form the inverter for the drive motor is formed of the wide band gap semiconductor.

In this case, by using a wide band gap semiconductor element having a loss lower than that of a Si-IGBT element as the power semiconductor element of the power conversion device mounted to the electrically driven vehicle, it is possible to improve the fuel efficiency and the electricity efficiency of the electrically driven vehicle.

That is, it is possible to obtain the power conversion device capable of reducing the loss of the power conversion device to improve the fuel efficiency and the electricity efficiency of the electrically driven vehicle.

DESCRIPTION OF EMBODIMENTS

A description is now given of a power conversion device according to preferred embodiments of the present invention with reference to the accompanying drawings, and throughout the drawings, like or corresponding components are denoted by like reference symbols to describe those components.

First Embodiment

Figure 1:
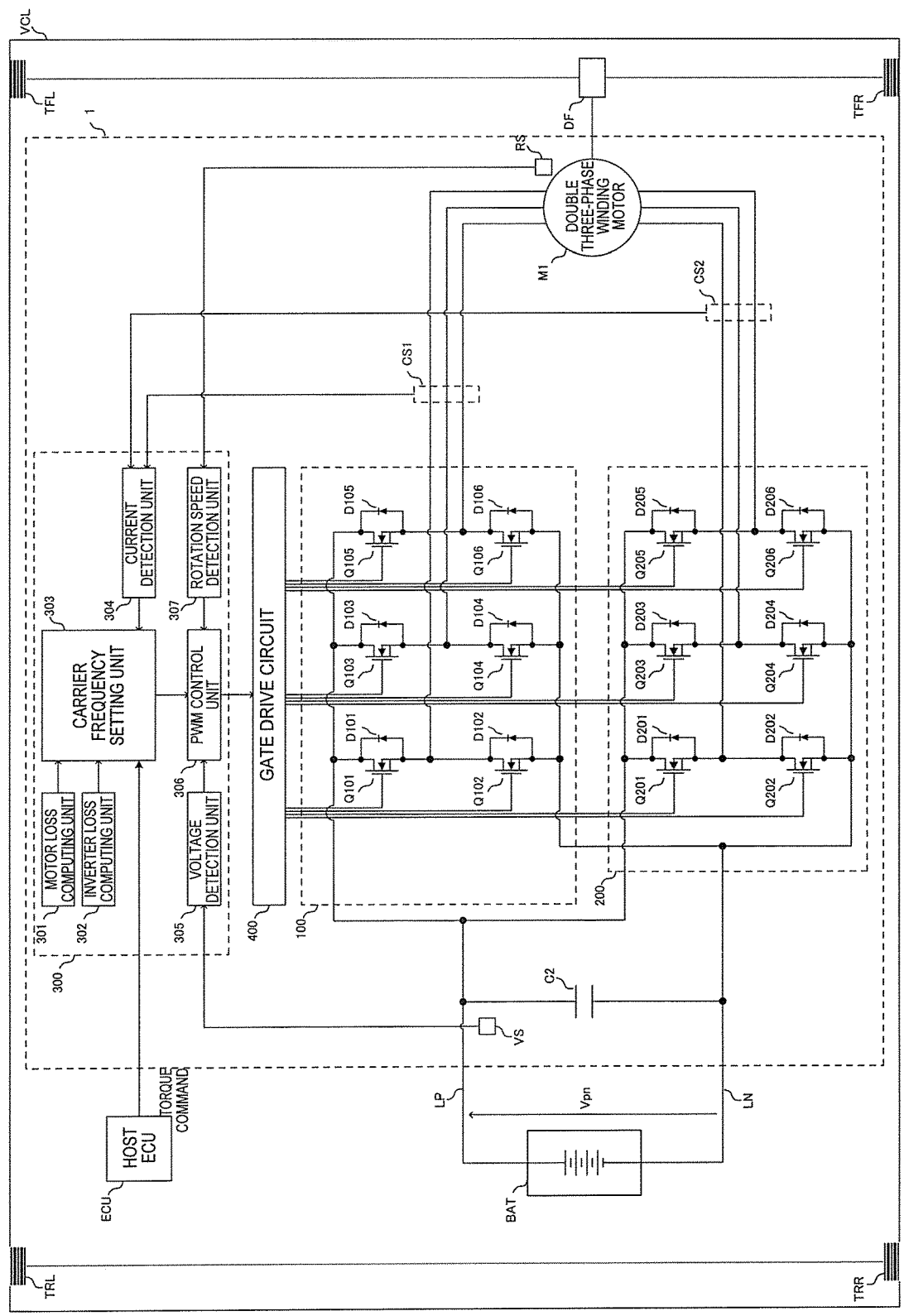
FIG. 1 is a block diagram for illustrating a power conversion device according to a first embodiment of the present invention.

FIG. 1 is a block diagram for illustrating a power conversion device according to a first embodiment of the present invention. In FIG. 1, a power conversion device 1 is mounted to a vehicle VCL, and is configured to drive a double three-phase winding motor M1 through use of electric power of a high voltage battery BAT being a DC power supply. The power conversion device 1 also includes a smoothing capacitor C2, an inverter 100, an inverter 200, a current sensor CS1, a current sensor CS2, a voltage sensor VS, a rotation speed sensor RS, a control device 300, and a gate drive circuit 400.

In this case, each of switching elements being power semiconductor elements that form the inverter 100 and the inverter 200 is a chip of a wide band gap semiconductor element made of, for example, silicon carbide, gallium nitride-based material, or diamond, and the double three-phase winding motor M1 is driven by the inverter 100 and the inverter 200 in a dual state. The double three-phase winding motor M1 is also referred to simply as "motor M1".

As the high voltage battery BAT, for example, a nickel metal hydride battery, a lithium ion battery, a lead acid battery, or other such secondary battery can be used. In addition, for example, a large capacity capacitor, a fuel cell, a sodium sulfur battery, or a metal-air battery may be used together with the secondary battery or in place of the secondary battery.

The inverter 100 receives a power supply potential Vpn from the high voltage battery BAT to drive the motor M1. It is preferred that, during braking of the vehicle VCL, the inverter 100 perform a regenerative operation by the motor M1, that is, use the motor M1 as a power generator to return electric power generated by the motor M1 to the high voltage battery BAT.

The inverter 100 also includes a plurality of switching elements, and is formed to have a bridge circuit in which three sets of series circuits each obtained by connecting two switching elements in series between a positive electrode side electric wire LP and a negative electrode side electric wire LN are provided in correspondence to windings (not shown) of the respective three phases, namely, U phase, V phase, and W phase. That is, the inverter 100 includes a total of six switching elements Q101, Q102, Q103, Q104, Q105, and Q106.

Specifically, in the series circuit of each of the phases, a source terminal of the switching element on the positive electrode side is connected to the positive electrode side electric wire LP, a drain terminal of the switching element on the positive electrode side is connected to a drain terminal of the switching element on the negative electrode side, and a source terminal of the switching element on the negative electrode side is connected to the negative electrode side electric wire LN. Meanwhile, a connection point between the switching element on the positive electrode side and the switching element on the negative electrode side is connected to the winding of the corresponding phase. The positive electrode side electric wire LP is connected to the positive electrode of the high voltage battery BAT, and the negative electrode side electric wire LN is connected to the negative electrode of the high voltage battery BAT.

The inverter 100 including a freewheeling diode connected in anti-parallel to each of the switching elements, and in the first embodiment, a total of six freewheeling diodes D101, D102, D103, D104, D105, and D106 are provided in correspondence to the total of six switching elements Q101, Q102, Q103, Q104, Q105, and Q106, respectively.

As the freewheeling diodes D101, D102, D103, D104, D105, and D106, parasitic diodes of the switching elements Q101, Q102, Q103, Q104, Q105, and Q106 may be used. In addition, in order to reserve current capacity as the inverter, the switching elements may be connected in parallel.

The inverter 200 receives the power supply potential Vpn from the high voltage battery BAT to drive the motor M1. It is preferred that, during braking of the vehicle VCL, the inverter 200 perform a regenerative operation by the motor M1, that is, use the motor M1 as a power generator to return electric power generated by the motor M1 to the high voltage battery BAT.

The inverter 200 also includes a plurality of switching elements, and is formed to have a bridge circuit in which three sets of series circuits each obtained by connecting two switching elements in series between the positive electrode side electric wire LP and the negative electrode side electric wire LN are provided in correspondence to windings (not shown) of the respective three phases, namely, R phase, S phase, and T phase. That is, the inverter 200 includes a total of six switching elements Q201, Q202, Q203, Q204, Q205, and Q206.

Specifically, in the series circuit of each of the phases, a source terminal of the switching element on the positive electrode side is connected to the positive electrode side electric wire LP, a drain terminal of the switching element on the positive electrode side is connected to a drain terminal of the switching element on the negative electrode side, and a source terminal of the switching element on the negative electrode side is connected to the negative electrode side electric wire LN. Meanwhile, a connection point between the switching element on the positive electrode side and the switching element on the negative electrode side is connected to the winding of the corresponding phase. The positive electrode side electric wire LP is connected to the positive electrode of the high voltage battery BAT, and the negative electrode side electric wire LN is connected to the negative electrode of the high voltage battery BAT.

The inverter 200 including a freewheeling diode connected in anti-parallel to each of the switching elements, and in the first embodiment, a total of six freewheeling diodes D201, D202, D203, D204, D205, and D206 are provided in correspondence to the total of six switching elements Q201, Q202, Q203, Q204, Q205, and Q206, respectively.

As the freewheeling diodes D201, D202, D203, D204, D205, and D206, parasitic diodes of the switching elements Q201, Q202, Q203, Q204, Q205, and Q206 may be used. In addition, in order to reserve current capacity as the inverter, the switching elements may be connected in parallel.

The smoothing capacitor C2 is connected between the positive electrode side electric wire LP and the negative electrode side electric wire LN, and smooths a DC voltage between the positive electrode side electric wire LP and the negative electrode side electric wire LN, which is a so-called system voltage.

A plurality of gate drive circuits 400 are provided in correspondence to the respective plurality of switching elements, and drive the corresponding switching elements.

In the first embodiment, twelve gate drive circuits 400 are provided. A gate terminal being a control terminal of each of the switching elements is connected to the corresponding one of the gate drive circuits 400.

The gate drive circuits 400 each output an on voltage signal or an off voltage signal to the corresponding switching element in accordance with an instruction to turn on or off each of the switching elements, which has been transmitted from the control device 300 via, for example, a photocoupler (not shown), to thereby switch the switching element into an on state or an off state.

The current sensor CS1 detects a current I1 flowing through the winding of the motor M1 from the inverter 100. A plurality of, for example, three or two current sensors CS1 are provided on electric wires connecting between the inverter 100 and the windings of the respective phases. An output signal from the current sensor CS1 is input to the control device 300.

The current sensor CS2 detects a current I2 flowing through the winding of the motor M1 from the inverter 200. A plurality of, for example, three or two current sensors CS2 are provided on electric wires connecting between the inverter 200 and the windings of the respective phases. An output signal from the current sensor CS2 is input to the control device 300.

The voltage sensor VS detects the DC voltage between the positive electrode side electric wire LP and the negative electrode side electric wire LN, which is a so-called system voltage. An output signal from the voltage sensor VS is input to the control device 300.

The rotation speed sensor RS detects a rotation speed and the rotation angle, that is, a magnetic pole position, of the rotor. The rotation speed sensor RS is mounted to a rotary shaft of the rotor. As the rotation speed sensor RS, for example, a resolver or a rotary encoder is used. An output signal from the rotation speed sensor RS is input to the control device 300.

The control device 300 controls the motor M1 by controlling the inverter 100 and the inverter 200. The control device 300 includes a motor loss computing unit 301, an inverter loss computing unit 302, a carrier frequency setting unit 303, a current detection unit 304, a voltage detection unit 305, a PWM control unit 306, and a rotation speed detection unit 307.

The motor loss computing unit 301 computes a motor loss based on, for example, a current (not shown) flowing through the motor M1 and a voltage (not shown) applied to the motor M1. The motor loss may be computed through use of a map calculated in advance based on an operating point, namely, the number of revolutions and a torque, of the motor M1.

The inverter loss computing unit 302 computes an inverter loss based on, for example, a current (not shown) flowing through the inverter 100 or the inverter 200, and a voltage (not shown) applied to the inverter 100 or the inverter 200. The inverter loss may be computed through use of a map calculated in advance based on the operating point, namely, the number of revolutions and the torque, of the motor M1.

The carrier frequency setting unit 303 sets a carrier frequency Fc of a carrier wave to be used for the PWM control. The carrier frequency setting unit 303 executes frequency change control for changing the carrier frequency Fc so as to minimize a total loss obtained by adding the motor loss computed by the motor loss computing unit 301 and the inverter loss computed by the inverter loss computing unit 302.

Figure 2:
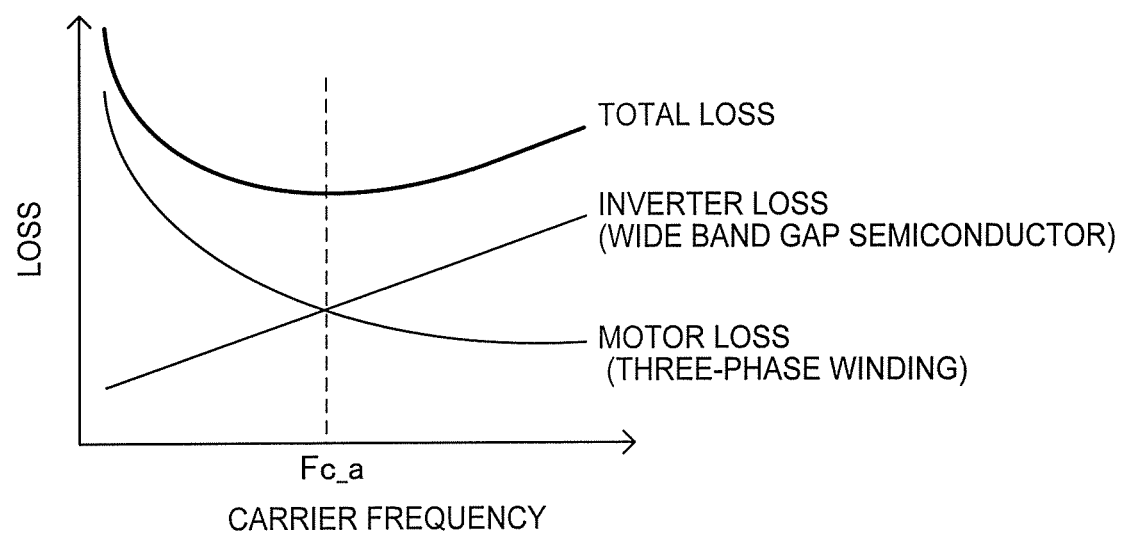
FIG. 2 is an explanatory graph for showing a relationship between a carrier frequency and each of a motor loss, a loss of an inverter using a wide band gap semiconductor, and a total loss obtained by adding those losses, which is exhibited by the power conversion device according to the first embodiment of the present invention.

Specifically, as shown in FIG. 2, by increasing the carrier frequency Fc, it is possible to decrease a power loss of the motor M1, which depends on the carrier frequency Fc. Meanwhile, when the carrier frequency Fc is increased, power losses of the inverter 100 and the inverter 200, which depend on the carrier frequency Fc, are increased. There is a carrier frequency Fc_a with which the total loss obtained by adding the motor loss and the inverter loss is minimized due to those characteristics, and the carrier frequency setting unit 303 executes the frequency change control so as to achieve the carrier frequency Fc_a.

The current detection unit 304 detects the current I1 flowing through the winding of the motor M1 from the inverter 100. The current detection unit 304 detects the current I1 flowing through the winding of each of the phases based on an output signal from the current sensor CS1 input to the control device 300. Meanwhile, the current detection unit 304 detects the current I2 flowing through the winding of the motor M1 from the inverter 200. The current detection unit 304 detects the current I2 flowing through the winding of each of the phases based on an output signal from the current sensor CS2 input to the control device 300.

The voltage detection unit 305 detects an input voltage supplied from the high voltage battery BAT to the inverter 100 and the inverter 200, which is a so-called system voltage. The voltage detection unit 305 detects the input voltage, which is a so-called system voltage, based on the output signal from the voltage sensor VS input to the control device 300.

The rotation speed detection unit 307 detects the rotation speed of the motor M1. The rotation speed detection unit 307 detects the rotation speed and the rotation angle, that is, the magnetic pole position, of the rotor based on the output signal from the rotation speed sensor RS.

The PWM control unit 306 performs the PWM control to subject the plurality of switching elements to the switching control. In this case, the PWM control represents pulse width modulation control. In the PWM control, the PWM control unit 306 compares the carrier wave of the carrier frequency Fc and an AC voltage command signal of each phase with each other, to thereby change a duty cycle of a rectangular pulse wave for turning on or off the switching element of each phase. The PWM control unit 306 performs current feedback control for performing the PWM control so that the current I1 and the current I2 flowing through the winding of the motor M1 become closer to a current command value.

In the first embodiment, the wide band gap semiconductor element is used as each of the switching elements of the inverter 100 and the inverter 200. This is because a loss of the switching element can be reduced to a level lower than that of a Si-IGBT element, which has hitherto been adopted, and because the carrier frequency can be enhanced.

The loss of the switching element can be roughly classified into a conduction loss and a switching loss. In general, although a detailed description is omitted, a wide band gap semiconductor has the conduction loss lower than that of a Si-IGBT.

Figure 3A:
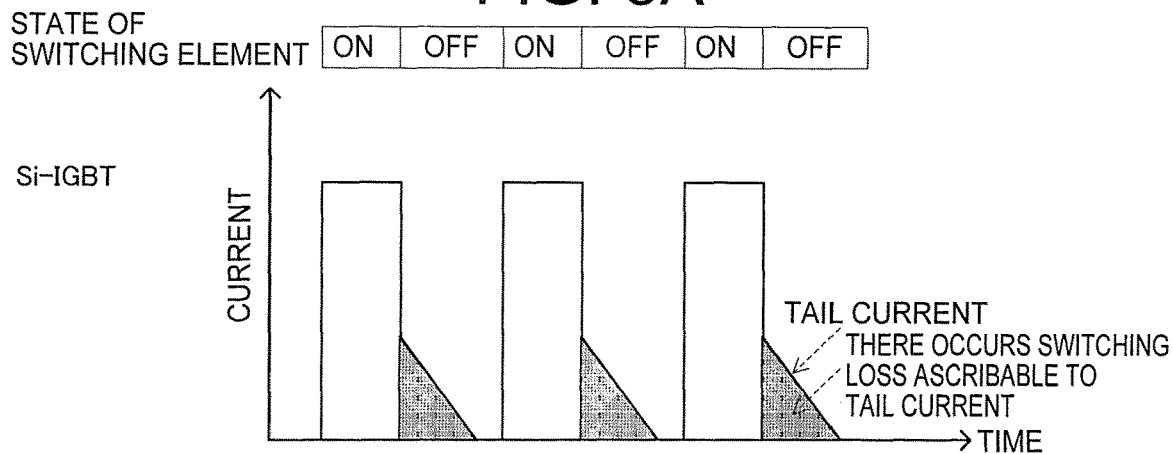
FIG. 3A is an explanatory graph for showing a switching loss of a Si-IGBT, which is exhibited by the power conversion device according to the first embodiment of the present invention.

Now, the switching loss is described with reference to FIG. 3. In the Si-IGBT, as shown in FIG. 3A, when the switching element is changed from an on state to an off state, a tail current is caused to flow through the switching element, and there occurs a switching loss ascribable to this tail current.

Figure 3B:
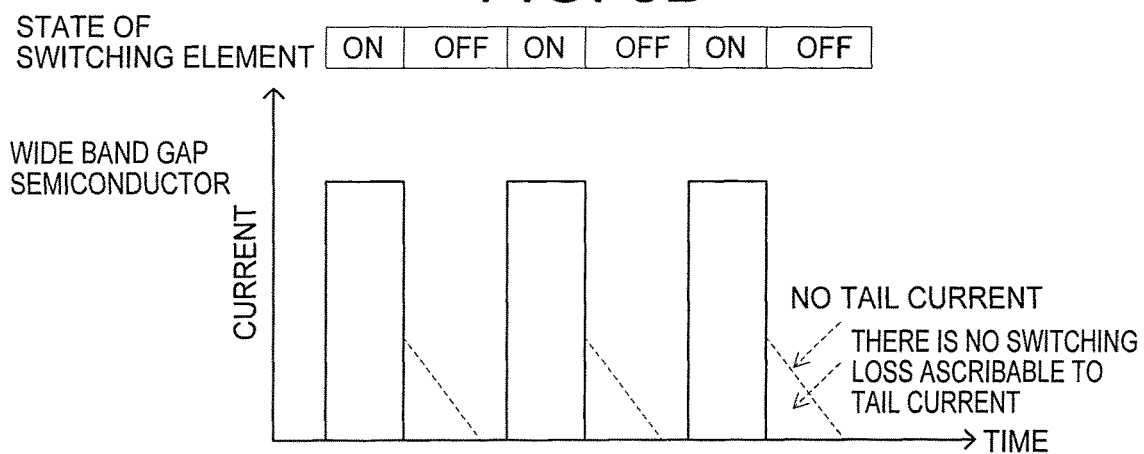
FIG. 3B is an explanatory graph for showing a switching loss of the wide band gap semiconductor, which is exhibited by the power conversion device according to the first embodiment of the present invention.

In contrast, in the case of using the wide band gap semiconductor, as shown in FIG. 3B, when the switching element is changed from an on state to an off state, there occurs no tail current flowing through the switching element.

Figure 3C:
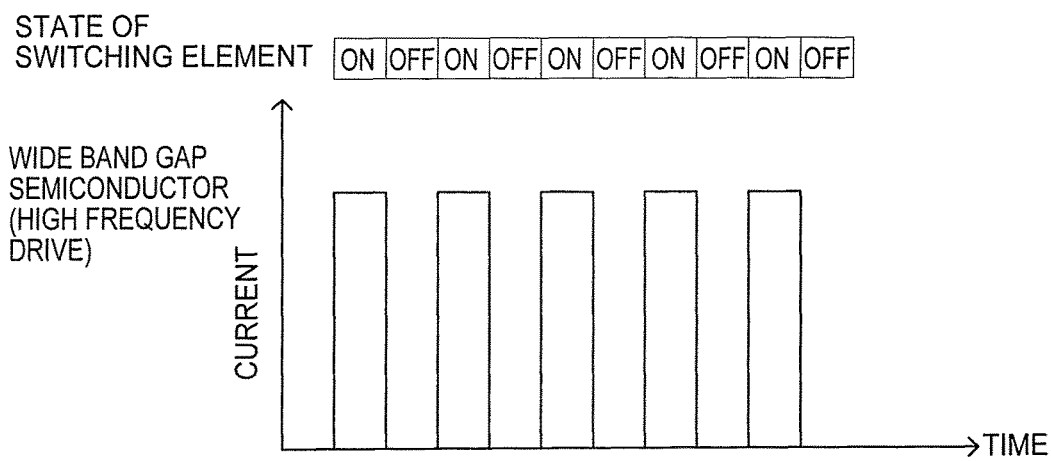
FIG. 3C is an explanatory graph for showing high frequency drive to be performed by the power conversion device according to the first embodiment of the present invention.

Therefore, the use of the wide band gap semiconductor allows the loss to become lower than in the case of using the Si-IGBT. In addition, a time to switch the switching element from an on state to an off state can be made earlier due to the fact that there occurs no tail current, and hence, as shown in FIG. 3C, the carrier frequency can be enhanced.

Figure 4:
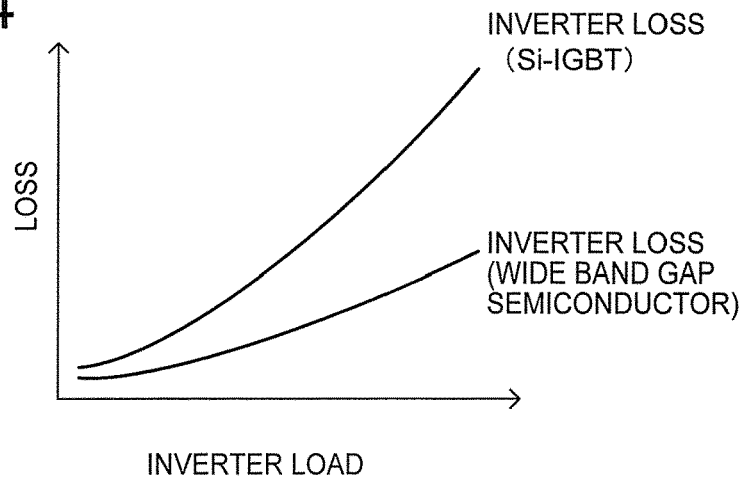
FIG. 4 is an explanatory graph for showing a relationship between an inverter loss and an inverter load in each of cases where the Si-IGBT and the wide band gap semiconductor are used as a switching element, which is exhibited by the power conversion device according to the first embodiment of the present invention.

In FIG. 4, there is shown a relationship between an inverter loss and an inverter load in each of the cases of using the Si-IGBT and the wide band gap semiconductor as each of the switching elements of the inverter 100 and the inverter 200. As described above, the wide band gap semiconductor has the conduction loss and the switching loss lower than those of the Si-IGBT, and the use of the wide band gap semiconductor lowers the inverter loss corresponding to the inverter load. This enables the power conversion device 1 mounted to the vehicle VCL to become highly efficient, and hence it is possible to improve electricity efficiency of the vehicle VCL.

Figure 5:
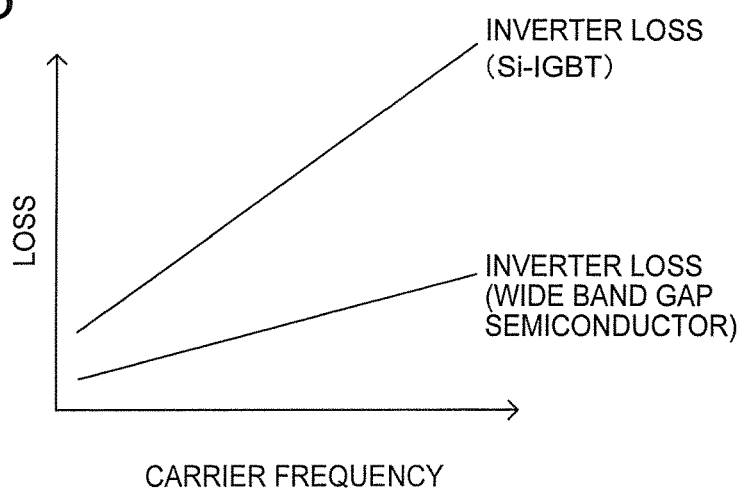
FIG. 5 is an explanatory graph for showing a relationship between the inverter loss and the carrier frequency in each of the cases where the Si-IGBT and the wide band gap semiconductor are used as the switching element, which is exhibited by the power conversion device according to the first embodiment of the present invention.

In FIG. 5, there is shown a relationship between the inverter loss and the carrier frequency in each of cases where the Si-IGBT and the wide band gap semiconductor are used as each of the switching elements of the inverter 100 and the inverter 200. As described above, the wide band gap semiconductor has the switching loss lower than that of the Si-IGBT, and hence an increase amount of the inverter loss exhibited when the carrier frequency is increased becomes smaller in the inverter using the wide band gap semiconductor than in the inverter using the Si-IGBT.

Figure 6:
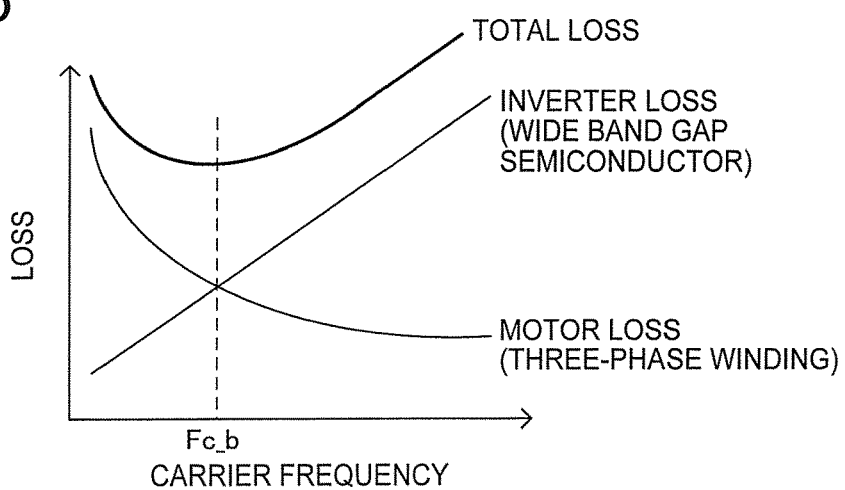
FIG. 6 is an explanatory graph for showing a relationship between the carrier frequency and each of the motor loss, the loss of an inverter using a Si-IGBT element, and a total loss obtained by adding those losses, which is exhibited by the power conversion device according to the first embodiment of the present invention.

In FIG. 6, there is shown a relationship between the carrier frequency and each of the motor loss, the loss of the inverter using the Si-IGBT element, and a total loss obtained by adding those losses. In the case of using the Si-IGBT element for the inverter, a carrier frequency Fc_b that minimizes the total loss becomes lower than in the case of using the wide band gap semiconductor. When the relationships between the motor loss and the carrier frequency are set to be the same, the carrier frequency Fc_b becomes lower than the carrier frequency Fc_a shown in FIG. 2.

That is, when the wide band gap semiconductor is used for the inverter, the total loss is minimized when the carrier frequency becomes higher, and the total loss also becomes lower. Therefore, the use of the wide band gap semiconductor capable of raising the carrier frequency to a higher level contributes to the reduction of the total loss.

Figure 7A:
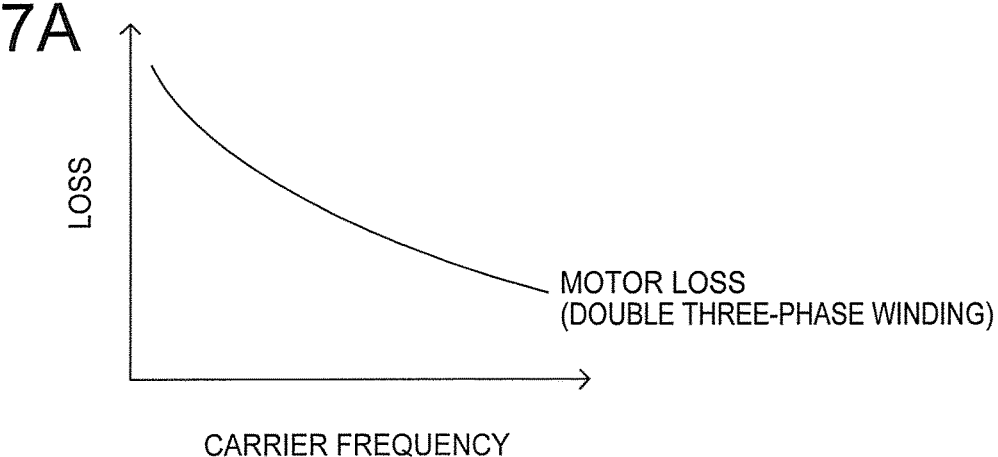
FIG. 7A is an explanatory graph for showing a relationship between the motor loss and the carrier frequency in a case where a motor is formed of double three-phase winding, which is exhibited by the power conversion device according to the first embodiment of the present invention.
Figure 7B:
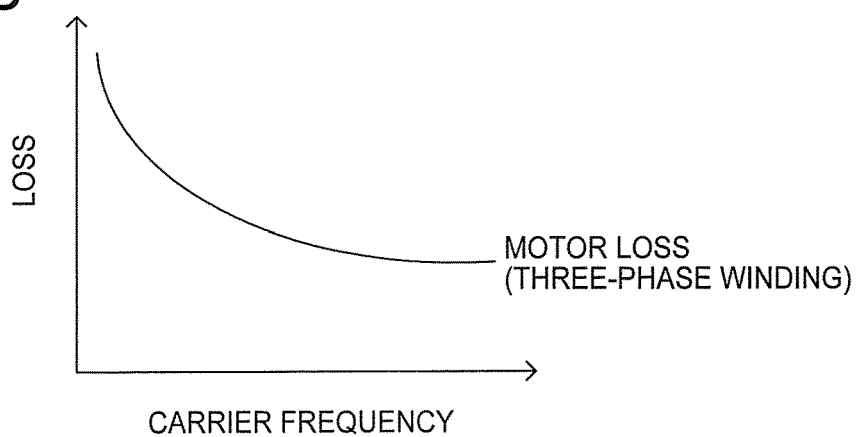
FIG. 7B is an explanatory graph for showing a relationship between the motor loss and the carrier frequency in a case where the motor is formed of three-phase winding, which is exhibited by the power conversion device according to the first embodiment of the present invention.

In FIG. 7A and FIG. 7B, there are shown relationships between the motor loss and the carrier frequency in cases where the motor is formed of double three-phase winding and formed of three-phase winding. By increasing the carrier frequency Fc, it is possible to decrease the motor loss that depends on the carrier frequency Fc, and a double three-phase winding motor tends to have a lower motor loss with a higher carrier frequency.

This is because the double three-phase winding motor has a lower reactance of the motor. As the reactance of the motor becomes lower, the harmonic component of a current flowing into the motor becomes larger, which increases the motor loss that depends thereon. The harmonic component of the current flowing into the motor can be reduced by increasing the carrier frequency, and hence the double three-phase winding motor can reduce the motor loss by being driven with a higher carrier frequency. Meanwhile, in the case of a three-phase winding motor having a high reactance of the motor, a reduction effect of the motor loss tends to be small even when the carrier frequency is increased to a level equal to or higher than a certain level.

Figure 8:
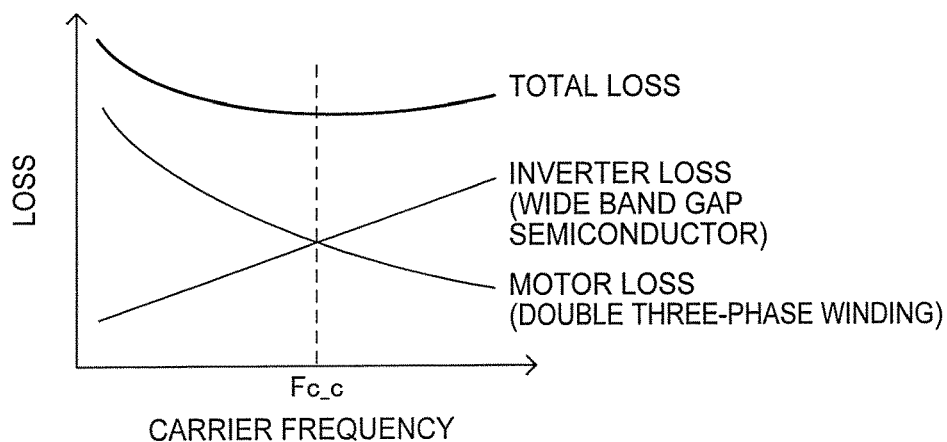
FIG. 8 is an explanatory graph for showing a relationship between the carrier frequency and each of the motor loss, the loss of the inverter using the wide band gap semiconductor, and the total loss obtained by adding those losses, which is exhibited by the power conversion device according to the first embodiment of the present invention.

From the above-mentioned points, as shown in FIG. 8, when the wide band gap semiconductor is used as each of the inverter 100 and the inverter 200 for controlling the double three-phase winding motor M1, the carrier frequency can be set higher to achieve Fc_c, to thereby be able to reduce the total loss obtained by adding the motor loss and the inverter loss. This enables the power conversion device 1 mounted to the vehicle VCL to become highly efficient, and hence it is possible to improve the electricity efficiency of the vehicle VCL.

Figure 9A:
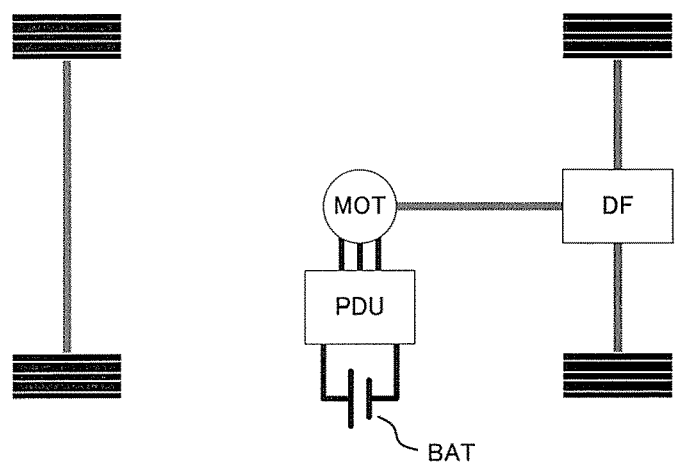
FIG. 9A is a configuration diagram for illustrating an electrically driven vehicle to which the power conversion device according to the first embodiment of the present invention can be applied.

In FIG. 9, configurations of the electrically driven vehicle to which the first embodiment can be applied are illustrated. FIG. 9A is an illustration of an EV including a motor MOT, an inverter PDU, the high voltage battery BAT, a final gear DF connected to the motor MOT by a shaft, and tires connected to the final gear DF by shafts, and the first embodiment can be applied to the EV.

The motor MOT corresponds to the motor M1 in FIG. 1, and a three-phase motor is used as the motor MOT for the sake of simplicity. The inverter PDU corresponds to the inverter 100 or the inverter 200 of FIG. 1. The first embodiment can also be applied to an FCV that employs the high voltage battery BAT as a fuel cell (not shown).

Figure 9B:
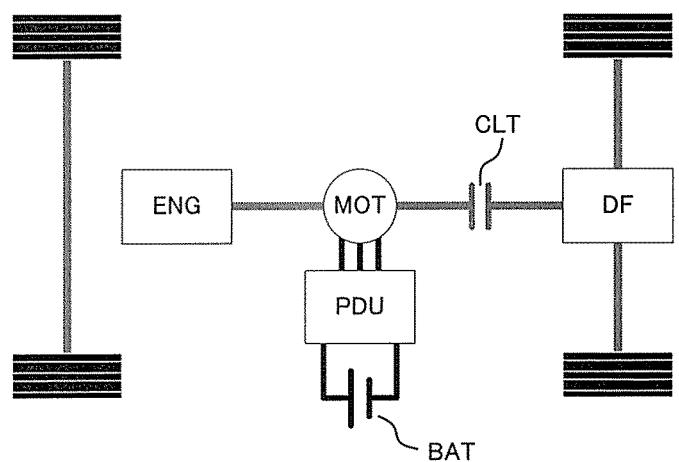
FIG. 9B is a configuration diagram for illustrating an electrically driven vehicle to which the power conversion device according to the first embodiment of the present invention can be applied.

FIG. 9B is an illustration of an HEV including the motor MOT, the inverter PDU, the high voltage battery BAT, the final gear DF connected to the motor MOT by the shaft via a clutch CLT, the tires connected to the final gear DF by the shafts, and the engine ENG coaxially connected to the motor MOT, and the first embodiment can be applied to the HEV.

The motor MOT corresponds to the motor M1 of FIG. 1, and a three-phase motor is used as the motor MOT for the sake of simplicity. The inverter PDU corresponds to the inverter 100 or the inverter 200 of FIG. 1. In this case, the clutch CLT may be replaced by a transmission (not shown). The first embodiment can also be applied to a PHEV in which a charger OBC (not shown) is connected in parallel to the high voltage battery BAT.

Figure 9C:
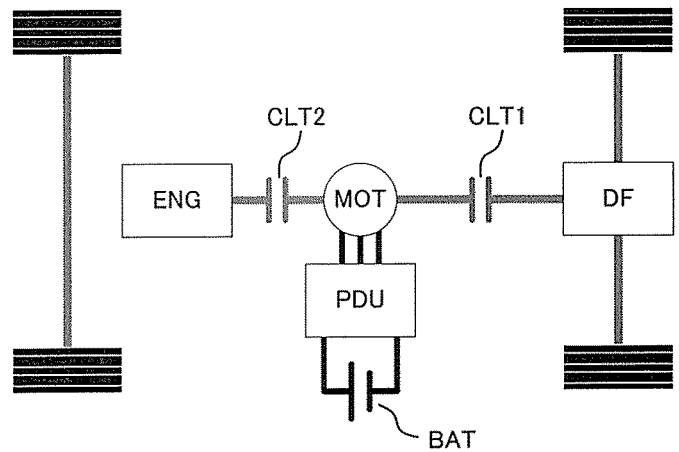
FIG. 9C is a configuration diagram for illustrating an electrically driven vehicle to which the power conversion device according to the first embodiment of the present invention can be applied.

FIG. 9C is an illustration of an HEV provided with a clutch CLT2 between the motor MOT and the engine ENG of FIG. 9B, and the first embodiment can be applied to the HEV. In this case, a clutch CLT1 may be replaced by a transmission (not shown). The first embodiment can also be applied to the PHEV in which the charger OBC (not shown) is connected in parallel to the high voltage battery BAT. When the first embodiment is applied to the HEV or the PHEV, it is possible to improve not only the electricity efficiency but also fuel efficiency of the vehicle.

As described above, the first embodiment includes an inverter for a drive motor, which is configured to control the drive motor by subjecting a plurality of power semiconductor elements to the switching control, and each of the plurality of power semiconductor elements that form the inverter for the drive motor is formed of the wide band gap semiconductor.

In this case, by using a wide band gap semiconductor element having a loss lower than that of the Si-IGBT element as the power semiconductor element of the power conversion device mounted to the electrically driven vehicle, it is possible to improve the fuel efficiency and the electricity efficiency of the electrically driven vehicle.

That is, it is possible to obtain the power conversion device capable of reducing the loss of the power conversion device to improve the fuel efficiency and the electricity efficiency of the electrically driven vehicle.

Second Embodiment

Figure 10:
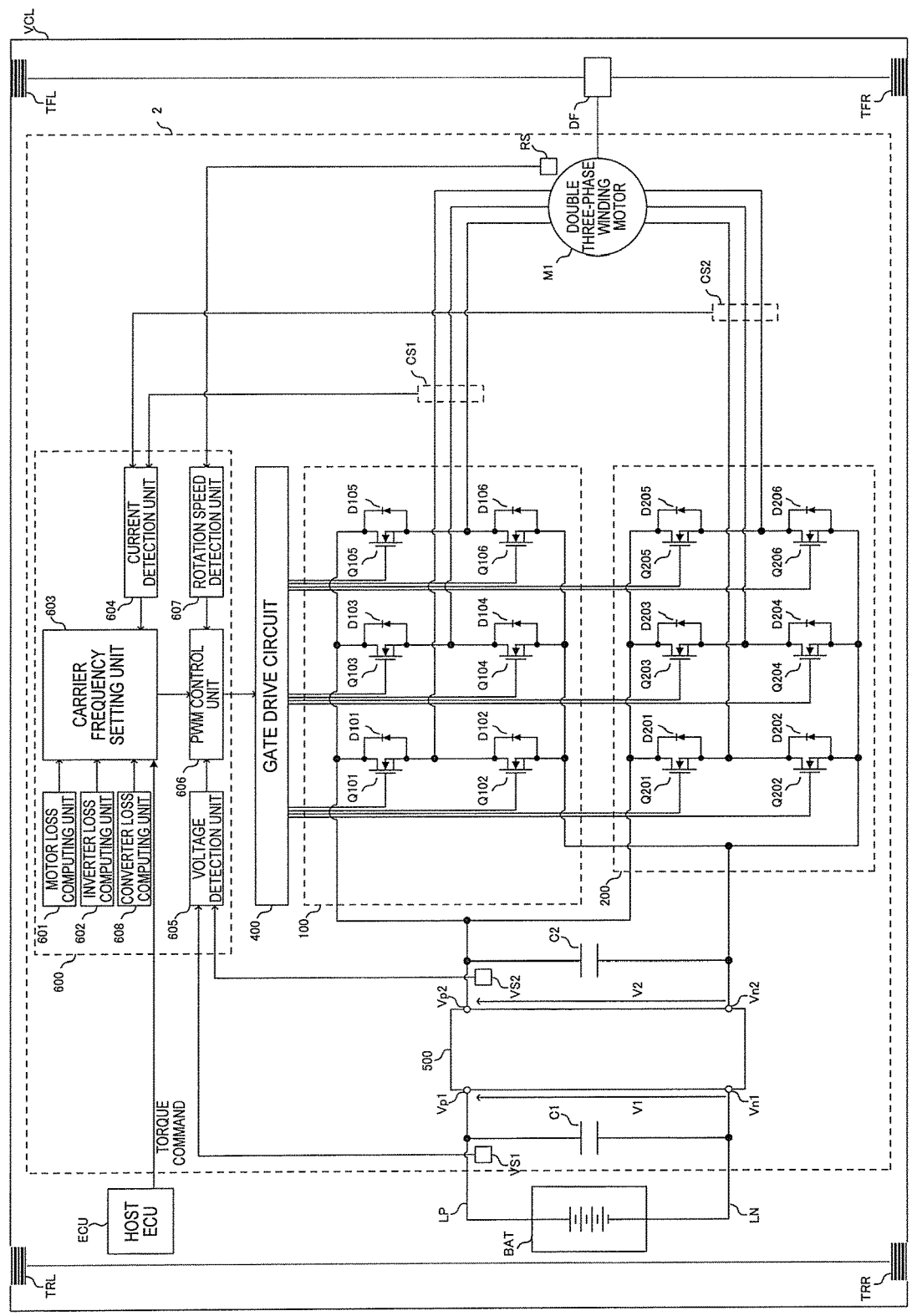
FIG. 10 is a block diagram for illustrating a power conversion device according to a second embodiment of the present invention.
Figure 11A:
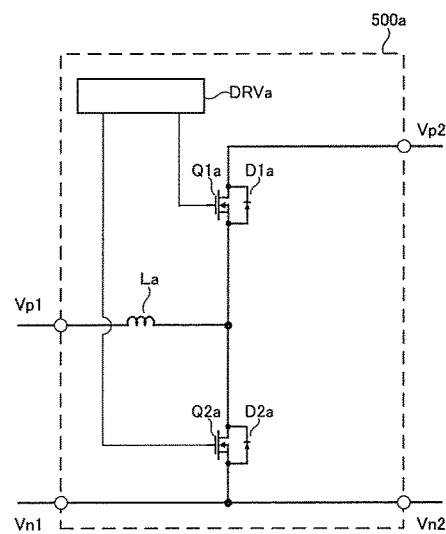
FIG. 11A is a circuit configuration diagram for illustrating a DCDC converter of the power conversion device according to the second embodiment of the present invention.
Figure 11B:
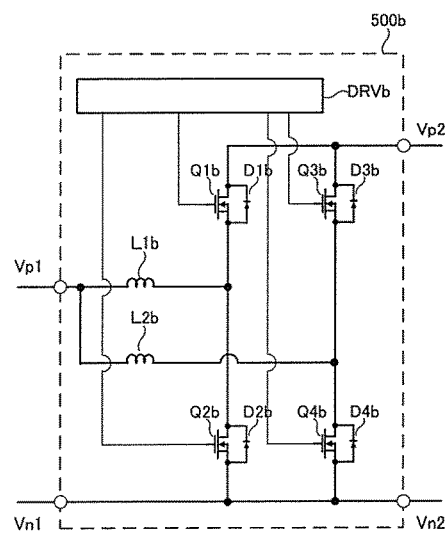
FIG. 11B is a circuit configuration diagram for illustrating a DCDC converter of the power conversion device according to the second embodiment of the present invention.
Figure 11C:
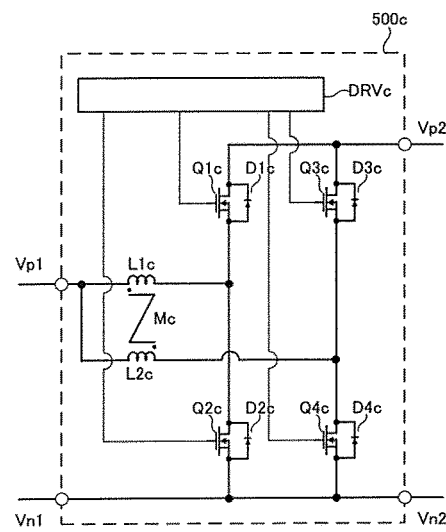
FIG. 11C is a circuit configuration diagram for illustrating a DCDC converter of the power conversion device according to the second embodiment of the present invention.
Figure 11D:
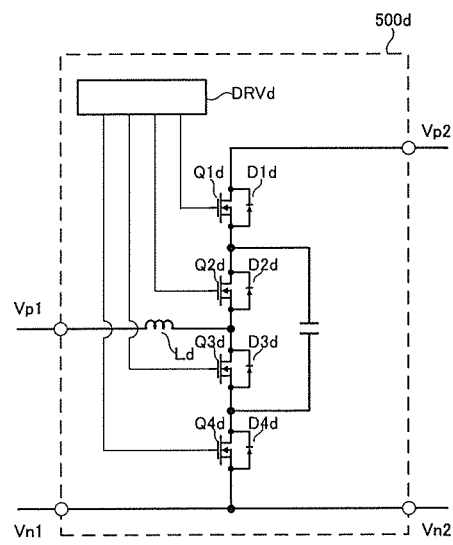
FIG. 11D is a circuit configuration diagram for illustrating a DCDC converter of the power conversion device according to the second embodiment of the present invention.
Figure 11E:
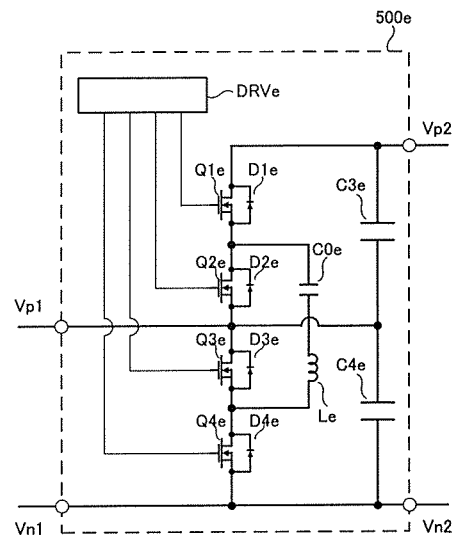
FIG. 11E is a circuit configuration diagram for illustrating a DCDC converter of the power conversion device according to the second embodiment of the present invention.

FIG. 10 is a block diagram for illustrating a power conversion device according to a second embodiment of the present invention. In FIG. 10, a power conversion device 2 is mounted to a vehicle VCL, and is configured to drive a double three-phase winding motor M1 through use of electric power of a high voltage battery BAT being a DC power supply.

The power conversion device 2 also includes a smoothing capacitor C1, a smoothing capacitor C2, an inverter 100, an inverter 200, a current sensor CS1, a current sensor CS2, a voltage sensor VS1, a voltage sensor VS2, a rotation speed sensor RS, a control device 600, a gate drive circuit 400, and a DCDC converter 500.

The DCDC converter 500 raises a DC voltage V1 input to a section between voltage terminals Vn1 and Vp1 to a DC voltage V2 higher than the DC voltage V1, and outputs the DC voltage V2 to a section between voltage terminals Vn2 and Vp2. The DCDC converter 500 also lowers the DC voltage V2 input to the section between the voltage terminals Vn2 and Vp2 to the DC voltage V1 lower than the DC voltage V2, and outputs the DC voltage V1 to the section between the voltage terminals Vn1 and Vp1.

Circuit configurations of the DCDC converter 500 are illustrated in FIG. 11. The DCDC converter 500 is formed of a plurality of switching elements Q1 to Q4. FIG. 11A is an illustration of a chopper type DCDC converter, FIG. 11B is an illustration of an interleave type DCDC converter obtained by connecting two lines of the chopper type DCDC converters of FIG. 11A in parallel, FIG. 11C is an illustration of an interleave type DCDC converter that utilizes magnetic coupling of a reactor, and each of FIG. 11D and FIG. 11E is an illustration of a switched capacitor type DCDC converter.

In FIG. 11, C0, C3, and C4 each represent a capacitor, L, L1, and L2 each represent a reactor, M represents a mutual inductance, D1 to D4 each represent a diode, and DRV represents a gate drive circuit configured to generate drive signals for the switching elements Q1 to Q4.

In FIG. 11, non-insulation type DCDC converters are illustrated as examples, but may be DCDC converters of types other than the examples, or may be insulation type DCDC converters. In one embodiment of the present invention, the invention aims at which one of the Si-IGBT element and the wide band gap semiconductor is to be employed as the plurality of switching elements that form the DCDC converter 500, and hence descriptions of operation principles of the respective DCDC converters are omitted.

In this case, each of switching elements being power semiconductor elements that form the inverter 100 and the inverter 200 is a chip of a wide band gap semiconductor element formed of, for example, silicon carbide, gallium nitride-based material, or diamond, and the motor M1 is driven by the inverter 100 and the inverter 200 in a dual state.

As the high voltage battery BAT, for example, a nickel metal hydride battery, a lithium ion battery, a lead acid battery, or other such secondary battery can be used. In addition, for example, a large capacity capacitor, a fuel cell, a sodium sulfur battery, or a metal-air battery may be used together with the secondary battery or in place of the secondary battery.

The inverter 100 receives the power supply potential V2 from the DCDC converter 500 to drive the motor M1. It is preferred that, during the braking of the vehicle VCL, the inverter 100 perform the regenerative operation by the motor M1, that is, use the motor M1 as the power generator to return the electric power generated by the motor M1 to the high voltage battery BAT via the DCDC converter 500.

The inverter 100 also includes a plurality of switching elements, and is formed to have a bridge circuit in which three sets of series circuits each obtained by connecting two switching elements in series between a positive electrode side electric wire LP and a negative electrode side electric wire LN are provided in correspondence to windings (not shown) of the respective three phases, namely, U phase, V phase, and W phase. That is, the inverter 100 includes a total of six switching elements Q101, Q102, Q103, Q104, Q105, and Q106.

The inverter 200 receives the power supply potential V2 from the DCDC converter 500 to drive the motor M1. It is preferred that, during the braking of the vehicle VCL, the inverter 200 perform the regenerative operation by the motor M1, that is, use the motor M1 as the power generator to return the electric power generated by the motor M1 to the high voltage battery BAT via the DCDC converter 500.

The inverter 200 also includes a plurality of switching elements, and is formed to have a bridge circuit in which three sets of series circuits each obtained by connecting two switching elements in series between a positive electrode side electric wire LP and a negative electrode side electric wire LN are provided in correspondence to windings (not shown) of the respective three phases, namely, R phase, S phase, and T phase. That is, the inverter 200 includes a total of six switching elements Q201, Q202, Q203, Q204, Q205, and Q206.

The smoothing capacitor C1 is connected between the positive electrode side electric wire LP and the negative electrode side electric wire LN, and smooths the DC voltage between the positive electrode side electric wire LP and the negative electrode side electric wire LN. The smoothing capacitor C2 is connected between the voltage terminal Vp2 of the DCDC converter 500 and the voltage terminal Vn2 of the DCDC converter 500, and smooths the DC voltage between the voltage terminal Vp2 and the voltage terminal Vn2, which is a so-called system voltage.

A plurality of gate drive circuits 400 are provided in correspondence to the respective plurality of switching elements, and drive the corresponding switching elements. In the second embodiment, twelve gate drive circuits 400 are provided. A gate terminal being a control terminal of each of the switching elements is connected to the corresponding one of the gate drive circuits 400.

The gate drive circuits 400 each output an on voltage signal or an off voltage signal to the corresponding switching element in accordance with an instruction to turn on or off each of the switching elements, which has been transmitted from the control device 600 via, for example, a photocoupler (not shown), to thereby switch the switching element into an on state or an off state.

The current sensor CS1 detects the current I1 flowing through the winding of the motor M1 from the inverter 100. A plurality of, for example, three or two current sensors CS1 are provided on electric wires connecting between the inverter 100 and the windings of the respective phases. An output signal from the current sensor CS1 is input to the control device 600.

The current sensor CS2 detects the current I2 flowing through the winding of the motor M1 from the inverter 200. A plurality of, for example, three or two current sensors CS2 are provided on electric wires connecting between the inverter 200 and the windings of the respective phases. An output signal from the current sensor CS2 is input to the control device 600.

The voltage sensor VS1 detects the DC voltage between the positive electrode side electric wire LP and the negative electrode side electric wire LN. An output signal from the voltage sensor VS1 is input to the control device 600. The voltage sensor VS2 detects the DC voltage between the voltage terminal Vp2 and the voltage terminal Vn2, which is the so-called system voltage. An output signal from the voltage sensor VS2 is input to the control device 600.

The rotation speed sensor RS detects a rotation speed and the rotation angle, that is, a magnetic pole position, of the rotor. The rotation speed sensor RS is mounted to a rotary shaft of the rotor. As the rotation speed sensor RS, for example, a resolver or a rotary encoder is used. An output signal from the rotation speed sensor RS is input to the control device 600.

The control device 600 controls the motor M1 by controlling the inverter 100 and the inverter 200. The control device 600 includes a motor loss computing unit 601, an inverter loss computing unit 602, a carrier frequency setting unit 603, a current detection unit 604, a voltage detection unit 605, a PWM control unit 606, a rotation speed detection unit 607, and a converter loss computing unit 608.

The motor loss computing unit 601 computes a motor loss based on, for example, a current (not shown) flowing through the motor M1 and a voltage (not shown) applied to the motor M1. The motor loss may be computed through use of a map calculated in advance based on an operating point, namely, the number of revolutions and a torque, of the motor M1.

The inverter loss computing unit 602 computes an inverter loss based on, for example, a current (not shown) flowing through the inverter 100 or the inverter 200, and a voltage (not shown) applied to the inverter 100 or the inverter 200. The inverter loss may be computed through use of a map calculated in advance based on the operating point, namely, the number of revolutions and the torque, of the motor M1.

The converter loss computing unit 608 computes a converter loss based on, for example, a current (not shown) flowing through the DCDC converter 500 and a voltage (not shown) applied to the DCDC converter 500. The converter loss may be computed through use of a map calculated in advance based on an input voltage V1, an output voltage V2, an input current (not shown), and an output current (not shown).

The carrier frequency setting unit 603 sets the carrier frequency Fc of the carrier wave to be used for the PWM control. The carrier frequency setting unit 603 executes frequency change control for changing the carrier frequency Fci of the inverter so as to minimize a total loss obtained by adding the motor loss computed by the motor loss computing unit 601, the inverter loss computed by the inverter loss computing unit 602, and the converter loss computed by the converter loss computing unit 608.

Figure 12:
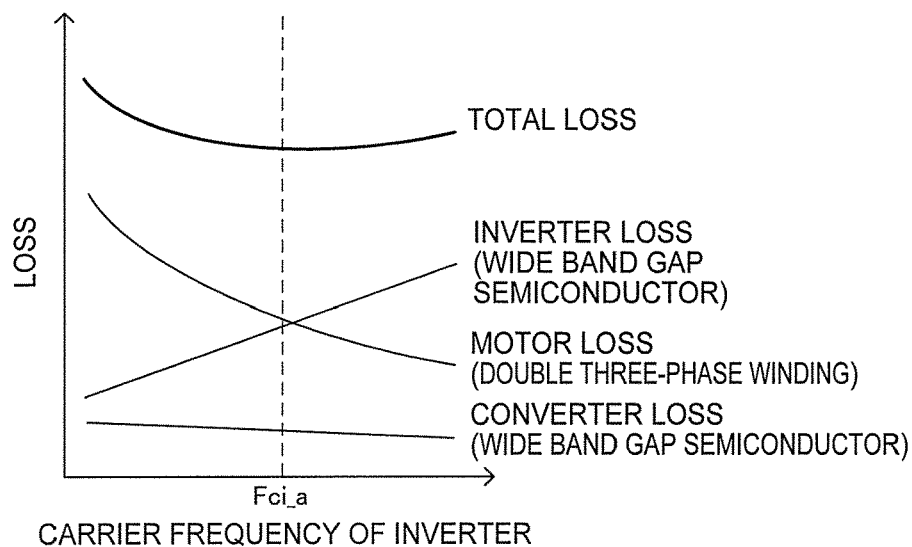
FIG. 12 is an explanatory graph for showing a relationship between a carrier frequency and each of a motor loss, an inverter loss and a converter loss due to use of a wide band gap semiconductor, and a total loss obtained by adding those losses, which is exhibited by the power conversion device according to the second embodiment of the present invention.

Specifically, as shown in FIG. 12, by increasing the carrier frequency Fci of the inverter, it is possible to decrease a power loss of the motor M1, which depends on the carrier frequency Fci of the inverter. Meanwhile, when the carrier frequency Fci of the inverter is increased, power losses of the inverter 100 and the inverter 200, which depend on the carrier frequency Fci of the inverter, are increased.

Meanwhile, when the carrier frequency Fci of the inverter is increased, a ripple voltage of the DCDC converter decreases, and hence it is possible to reduce the power loss of the DCDC converter 500. There is a carrier frequency Fci_a of the inverter with which the total loss obtained by adding the motor loss, the inverter loss, and the converter loss is minimized due to those characteristics, and the carrier frequency setting unit 603 executes the frequency change control so as to achieve the carrier frequency Fci_a of the inverter.

The current detection unit 604 detects the current I1 flowing through the winding of the motor M1 from the inverter 100. The current detection unit 604 detects the current I1 flowing through the winding of each of the phases based on an output signal from the current sensor CS1 input to the control device 600. Meanwhile, the current detection unit 604 detects the current I2 flowing through the winding of the motor M1 from the inverter 200. The current detection unit 604 detects the current I2 flowing through the winding of each of the phases based on an output signal from the current sensor CS2 input to the control device 600.

The voltage detection unit 605 detects the DC voltage between the positive electrode side electric wire LP and the negative electrode side electric wire LN and the DC voltage supplied from the DCDC converter 500 to the inverter 100 and the inverter 200, each of which is a so-called system voltage. The voltage detection unit 605 detects the respective DC voltages based on the output signals from the voltage sensor VS1 and the voltage sensor VS2 that are input to the control device 600.

The rotation speed detection unit 607 detects the rotation speed of the motor M1. The rotation speed detection unit 607 detects the rotation speed and the rotation angle, that is, the magnetic pole position, of the rotor based on the output signal from the rotation speed sensor RS.

The PWM control unit 606 performs the PWM control to subject the plurality of switching elements to the switching control. In this case, the PWM control represents pulse width modulation control. In the PWM control, the PWM control unit 606 compares the carrier wave of the carrier frequency Fc and an AC voltage command signal of each phase with each other, to thereby change a duty cycle of a rectangular pulse wave for turning on or off the switching element of each phase. The PWM control unit 606 performs current feedback control for performing the PWM control so that the current I1 and the current I2 flowing through the winding of the motor M1 become closer to a current command value.

In the second embodiment, the wide band gap semiconductor element is used as each of the switching elements of the inverter 100 and the inverter 200. This is because a loss of the switching element can be reduced to a level lower than that of a Si-IGBT element, which has hitherto been adopted, and because the carrier frequency can be enhanced.

Figure 13:
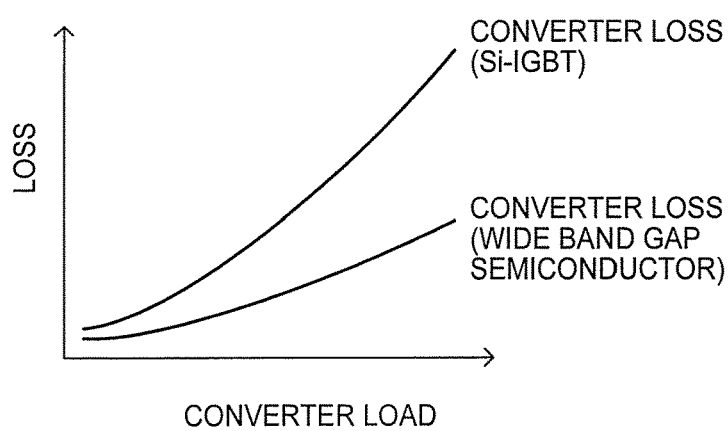
FIG. 13 is an explanatory graph for showing a relationship between the converter loss and a converter load in each of cases where a Si-IGBT and the wide band gap semiconductor are used as a switching element, which is exhibited by the power conversion device according to the first embodiment of the present invention.

In FIG. 13, there is shown a relationship between a converter loss and a converter load in each of the cases of using the Si-IGBT and the wide band gap semiconductor as each of the switching elements of the DCDC converter 500. As in the inverter 100 and the inverter 200, the wide band gap semiconductor has the conduction loss and the switching loss lower than those of the Si-IGBT, and the use of the wide band gap semiconductor lowers the converter loss corresponding to the converter load. This enables the power conversion device 2 mounted to the vehicle VCL to become highly efficient, and hence it is possible to improve electricity efficiency of the vehicle VCL.

Figure 14:
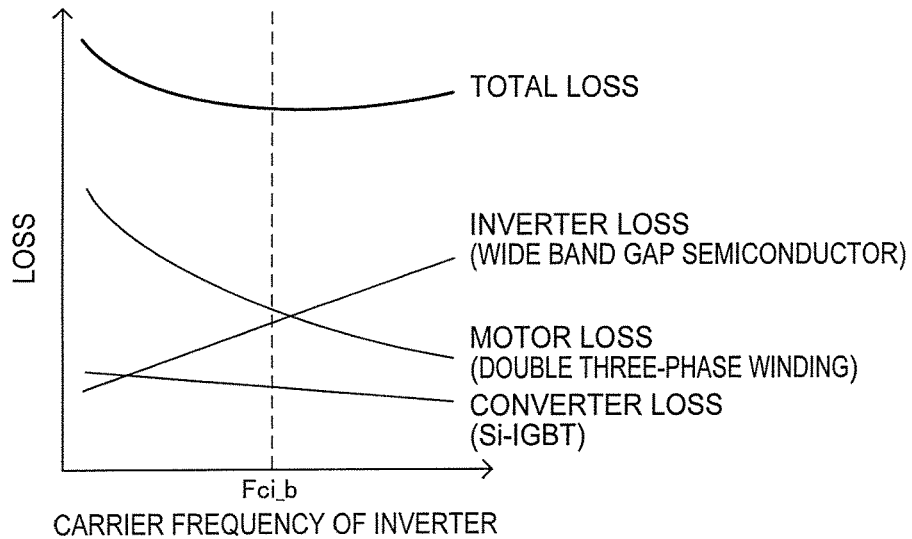
FIG. 14 is an explanatory graph for showing a relationship between the carrier frequency and each of a motor loss, the loss of the inverter using the wide band gap semiconductor, a loss of a converter using a Si-IGBT element, and a total loss obtained by adding those losses, which is exhibited by the power conversion device according to the first embodiment of the present invention.

In FIG. 14, there is shown a relationship between the carrier frequency and each of the motor loss, the loss of the inverter using the wide band gap semiconductor, the loss of the converter using the Si-IGBT element, and the total loss obtained by adding those losses. In the case of using the Si-IGBT element for the converter, a carrier frequency Fci_b that minimizes the total loss becomes lower than in the case of using the wide band gap semiconductor. When the relationships between the motor loss and the carrier frequency are set to be the same, the carrier frequency Fci_b becomes lower than the carrier frequency Fci_a shown in FIG. 12.

That is, when the wide band gap semiconductor is used for the converter, the total loss is minimized when the carrier frequency becomes higher, and the total loss also becomes lower. Therefore, the use of the wide band gap semiconductor capable of raising the carrier frequency to a higher level contributes to the reduction of the total loss.

Figure 15A:
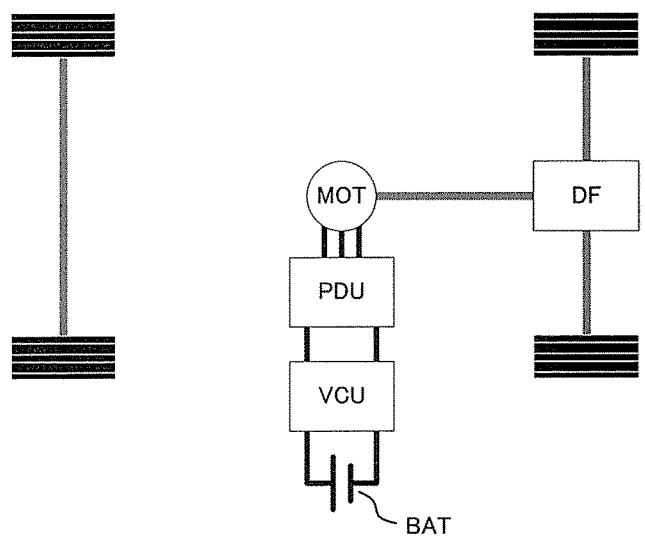
FIG. 15A is a configuration diagram for illustrating an electrically driven vehicle to which the power conversion device according to the second embodiment of the present invention can be applied.

In FIG. 15, configurations of the electrically driven vehicle to which the second embodiment can be applied are illustrated. FIG. 15A is an illustration of an EV including a motor MOT, an inverter PDU, a converter VCU, the high voltage battery BAT, a final gear DF connected to the motor MOT by a shaft, and tires connected to the final gear DF by shafts, and the second embodiment can be applied to the EV.

The motor MOT corresponds to the motor M1 of FIG. 10, and a three-phase motor is used as the motor MOT for the sake of simplicity. The inverter PDU corresponds to the inverter 100 or the inverter 200 of FIG. 10. The converter VCU corresponds to the DCDC converter 500 of FIG. 10. The second embodiment can also be applied to an FCV that employs the high voltage battery BAT as a fuel cell (not shown).

Figure 15B:
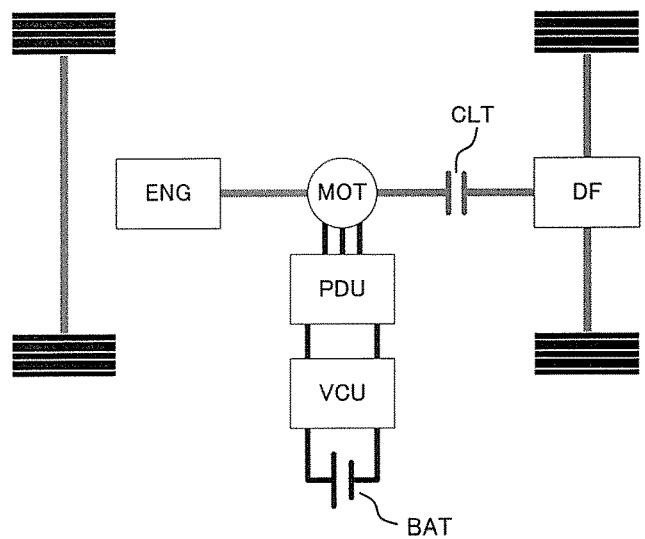
FIG. 15B is a configuration diagram for illustrating an electrically driven vehicle to which the power conversion device according to the second embodiment of the present invention can be applied.

FIG. 15B is an illustration of an HEV including the motor MOT, the inverter PDU, the converter VCU, the high voltage battery BAT, the final gear DF connected to the motor MOT by the shaft via a clutch CLT, the tires connected to the final gear DF by the shafts, and the engine ENG coaxially connected to the motor MOT, and the second embodiment can be applied to the HEV.

The motor MOT corresponds to the motor M1 of FIG. 10, and a three-phase motor is used as the motor MOT for the sake of simplicity. The inverter PDU corresponds to the inverter 100 or the inverter 200 of FIG. 10. The converter VCU corresponds to the DCDC converter 500 of FIG. 10. In this case, the clutch CLT may be replaced by a transmission (not shown). The second embodiment can also be applied to a PHEV in which a charger OBC (not shown) is connected in parallel to the high voltage battery BAT.

Figure 15C:
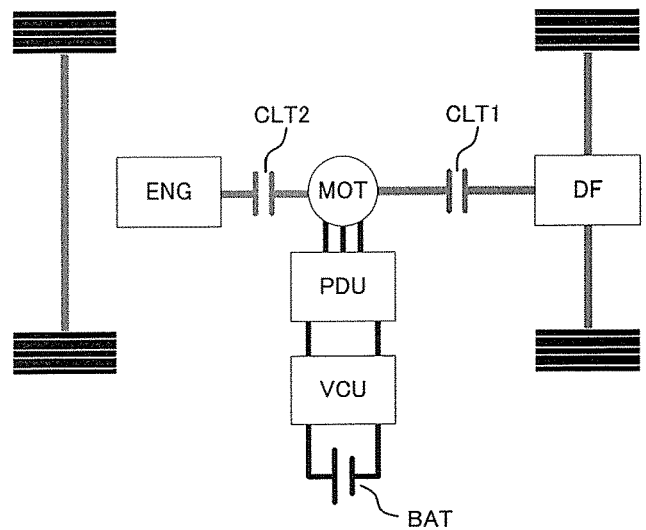
FIG. 15C is a configuration diagram for illustrating an electrically driven vehicle to which the power conversion device according to the second embodiment of the present invention can be applied.

FIG. 15C is an illustration of an HEV provided with a clutch CLT2 between the motor MOT and the engine ENG of FIG. 15B, and the second embodiment can be applied to the HEV. In this case, a clutch CLT1 may be replaced by the transmission (not shown). The second embodiment can also be applied to the PHEV in which the charger OBC (not shown) is connected in parallel to the high voltage battery BAT. When the second embodiment is applied to the HEV or the PHEV, it is possible to improve not only the electricity efficiency but also fuel efficiency of the vehicle.

In each of the electrically driven vehicles illustrated in FIG. 15, as in the above-mentioned embodiment, the wide band gap semiconductor may be used as each of the switching elements of both the inverter PDU and the converter VCU, or may be used as each of the switching elements of any one thereof. In any of the cases, the total loss of the power conversion device 2 can be reduced, to thereby be able to improve the electricity efficiency and the fuel efficiency of the electrically driven vehicle.

Third Embodiment

Figure 16:
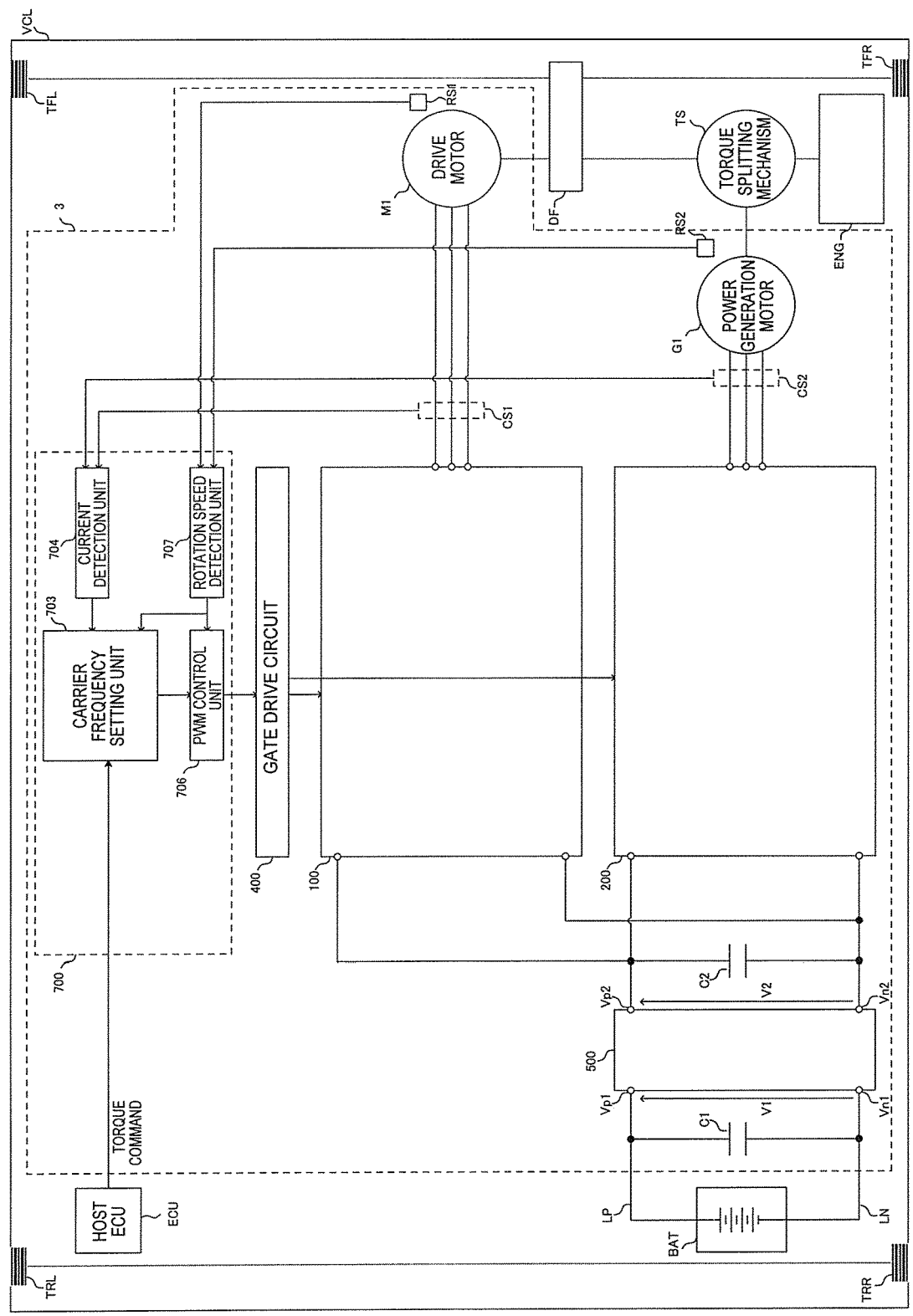
FIG. 16 is a block diagram for illustrating a power conversion device according to a third embodiment of the present invention.

FIG. 16 is a block diagram for illustrating a power conversion device according to a third embodiment of the present invention. In FIG. 16, a power conversion device 3 is mounted to a vehicle VCL, and is configured to drive a double three-phase winding motor M1 and a power generation motor G1 through use of electric power of a high voltage battery BAT being a DC power supply. The power conversion device 3 also includes a smoothing capacitor C1, a smoothing capacitor C2, an inverter 100, an inverter 200, a current sensor CS1, a current sensor CS2, a rotation speed sensor RS1, a rotation speed sensor RS2, a control device 700, a gate drive circuit 400, and a DCDC converter 500.

The DCDC converter 500 raises a DC voltage V1 input to a section between voltage terminals Vn1 and Vp1 to a DC voltage V2 higher than the DC voltage V1, and outputs the DC voltage V2 to a section between voltage terminals Vn2 and Vp2. The DCDC converter 500 also lowers the DC voltage V2 input to the section between the voltage terminals Vn2 and Vp2 to the DC voltage V1 lower than the DC voltage V2, and outputs the DC voltage V1 to the section between the voltage terminals Vn1 and Vp1.

In this case, each of the switching elements being the power semiconductor elements that form the inverter 100 is a chip of a wide band gap semiconductor element formed of, for example, silicon carbide, gallium nitride-based material, or diamond, and the drive motor M1 is driven by the inverter 100.

In addition, each of the switching elements being the power semiconductor elements that form the inverter 200 is a chip of the Si-IGBT element, and the power generation motor G1 is driven by the inverter 200. The configurations of the inverter 100 and the inverter 200 are the same as those of the first and second embodiments, and are therefore omitted herein.

As the high voltage battery BAT, for example, a nickel metal hydride battery, a lithium ion battery, a lead acid battery, or other such secondary battery can be used. In addition, for example, a large capacity capacitor, a fuel cell, a sodium sulfur battery, or a metal-air battery may be used together with the secondary battery or in place of the secondary battery.

The inverter 100 receives the power supply potential V2 from the DCDC converter 500 to drive the drive motor M1. It is preferred that, during the braking of the vehicle VCL, the inverter 100 perform the regenerative operation by the drive motor M1, that is, use the drive motor M1 as the power generator to return the electric power generated by the drive motor M1 to the high voltage battery BAT via the DCDC converter 500.

The inverter 200 receives the power supply potential V2 from the DCDC converter 500 to drive the power generation motor G1. The inverter 200 also converts, into DC power, AC power generated when the power generation motor G1 connected to the engine ENG via the torque splitting mechanism TS rotates the power generation motor G1 by power of the engine ENG. The DC power obtained through the conversion is returned to the high voltage battery BAT via the DCDC converter 500, or drives the drive motor M1 via the inverter 100.

The smoothing capacitor C1 is connected between the positive electrode side electric wire LP and the negative electrode side electric wire LN, and smooths the DC voltage between the positive electrode side electric wire LP and the negative electrode side electric wire LN. The smoothing capacitor C2 is connected between the voltage terminal Vp2 of the DCDC converter 500 and the voltage terminal Vn2 of the DCDC converter 500, and smooths the DC voltage between the voltage terminal Vp2 and the voltage terminal Vn2, which is a so-called system voltage.

A plurality of gate drive circuits 400 are provided in correspondence to the respective plurality of switching elements, and drive the corresponding switching elements. A gate terminal being a control terminal of each of the switching elements is connected to the corresponding one of the gate drive circuits 400.

The gate drive circuits 400 each output an on voltage signal or an off voltage signal to the corresponding switching element in accordance with an instruction to turn on or off each of the switching elements, which has been transmitted from the control device 700 via, for example, a photocoupler (not shown), to thereby switch the switching element into an on state or an off state.

The current sensor CS1 detects the current I1 flowing through the winding of the drive motor M1 from the inverter 100. A plurality of, for example, three or two current sensors CS1 are provided on electric wires connecting between the inverter 100 and the windings of the respective phases. An output signal from the current sensor CS1 is input to the control device 700.

The current sensor CS2 detects the current I2 flowing through the winding of the power generation motor G1 from the inverter 200. A plurality of, for example, three or two current sensors CS2 are provided on electric wires connecting between the inverter 200 and the windings of the respective phases. An output signal from the current sensor CS2 is input to the control device 700.

The rotation speed sensor RS1 detects the rotation speed and the rotation angle, that is, the magnetic pole position, of the rotor of the drive motor M1. The rotation speed sensor RS1 is mounted to the rotary shaft of the rotor. As the rotation speed sensor RS1, for example, a resolver or a rotary encoder is used. An output signal from the rotation speed sensor RS1 is input to the control device 700.

The rotation speed sensor RS2 detects the rotation speed and the rotation angle, that is, a magnetic pole position, of the rotor of the power generation motor G1. The rotation speed sensor RS2 is mounted to the rotary shaft of the rotor. As the rotation speed sensor RS2, for example, a resolver or a rotary encoder is used. An output signal from the rotation speed sensor RS2 is input to the control device 700.

The control device 700 controls the drive motor M1 by controlling the inverter 100, and controls the power generation motor G1 by controlling the inverter 200. The control device 700 includes a carrier frequency setting unit 703, a current detection unit 704, a PWM control unit 706, and a rotation speed detection unit 707.

The rotation speed detection unit 707 detects the rotation speed of the drive motor M1. The rotation speed detection unit 707 detects the rotation speed and the rotation angle, that is, the magnetic pole position, of the rotor of the drive motor M1 based on the output signal from the rotation speed sensor RS1.

The rotation speed detection unit 707 also detects the rotation speed of the power generation motor G1. The rotation speed detection unit 707 detects the rotation speed and the rotation angle, that is, the magnetic pole position, of the rotor of the power generation motor G1 based on the output signal from the rotation speed sensor RS2.

The carrier frequency setting unit 703 sets the carrier frequency Fc of the carrier wave to be used for the PWM control. The carrier frequency setting unit 703 executes frequency change control for changing the carrier frequency Fc to a higher level as the rotation speed of the drive motor M1 detected by the rotation speed detection unit 707 becomes higher.

Figure 17:
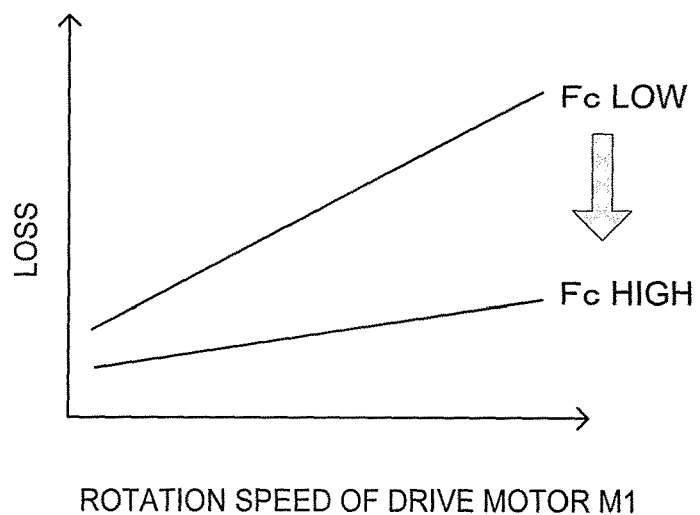
FIG. 17 is an explanatory graph for showing a relationship between a rotation speed and a loss of a drive motor, which is exhibited by the power conversion device according to the third embodiment of the present invention.

Specifically, as shown in FIG. 17, the power loss of the drive motor M1, which depends on the carrier frequency Fc, becomes higher as the rotation speed of the drive motor M1 becomes higher. Therefore, by increasing the carrier frequency Fc as the rotation speed of the drive motor M1 becomes higher, it is possible to effectively reduce the power loss of the drive motor M1.

Figure 18A:
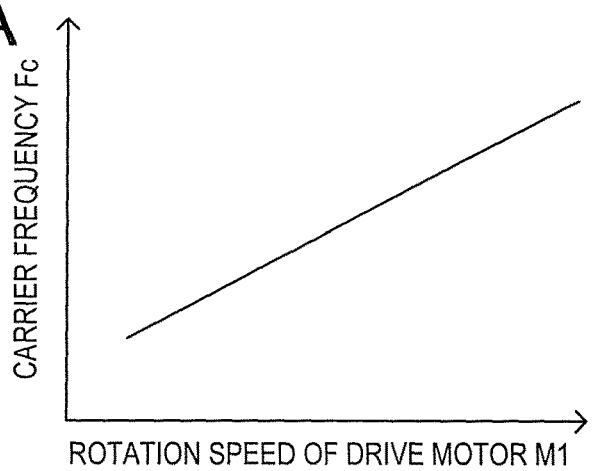
FIG. 18A is an explanatory graph for exemplifying frequency change control to be performed by the power conversion device according to the third embodiment of the present invention.
Figure 18B:
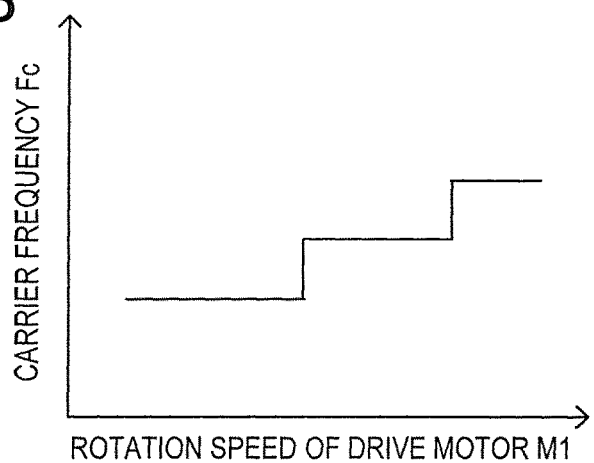
FIG. 18B is an explanatory graph for exemplifying the frequency change control to be performed by the power conversion device according to the third embodiment of the present invention.

For example, the carrier frequency setting unit 703 executes the frequency change control so as to change, depending on the rotation speed of the drive motor M1, the carrier frequency Fc to have a linear shape as shown in FIG. 18A or the carrier frequency Fc stepwise as shown in FIG. 18B.

The current detection unit 704 detects the current I1 flowing through the winding of the drive motor M1 from the inverter 100. The current detection unit 704 detects the current I1 flowing through the winding of each of the phases of the drive motor M1 based on an output signal from the current sensor CS1 input to the control device 700.

Meanwhile, the current detection unit 704 detects the current I2 flowing through the winding of the power generation motor G1 from the inverter 200. The current detection unit 704 detects the current I2 flowing through the winding of each of the phases of the power generation motor G1 based on an output signal from the current sensor CS2 input to the control device 700.

The PWM control unit 706 performs the PWM control to subject the plurality of switching elements to the switching control. In this case, the PWM control represents pulse width modulation control. In the PWM control, the PWM control unit 706 compares the carrier wave of the carrier frequency Fc and an AC voltage command signal of each phase with each other, to thereby change a duty cycle of a rectangular pulse wave for turning on or off the switching element of each phase.

The PWM control unit 706 performs current feedback control for performing the PWM control so that the current I1 flowing through the winding of the drive motor M1 becomes closer to the current command value. Meanwhile, the PWM control unit 706 performs current feedback control for performing the PWM control so that the current I2 flowing through the winding of the power generation motor G1 becomes closer to the current command value.

In the third embodiment, the wide band gap semiconductor element is used as each of the switching elements of the inverter 100. This is because a loss of the switching element can be reduced to a level lower than that of a Si-IGBT element, which has hitherto been adopted, and because the carrier frequency can be enhanced. This enables the power conversion device 3 mounted to the vehicle VCL to become highly efficient, and hence it is possible to improve electricity efficiency and fuel efficiency of the vehicle VCL.

In the third embodiment, the carrier frequency setting unit 703 changes the carrier frequency for driving the inverter 100 depending on the rotation speed of the drive motor M1, but the same effect can be produced even by instead changing the carrier frequency for driving the inverter 200 depending on the rotation speed of the power generation motor G1.

In addition, the carrier frequency setting unit 703 changes the carrier frequency for driving the inverter 100 depending on the rotation speed of the drive motor M1 and changes the carrier frequency for driving the inverter 200 depending on the rotation speed of the power generation motor G1, to thereby enable the power conversion device 3 mounted to the vehicle VCL to become more highly efficient, and hence it is possible to further improve the electricity efficiency and the fuel efficiency of the vehicle VCL.

Figure 19A:
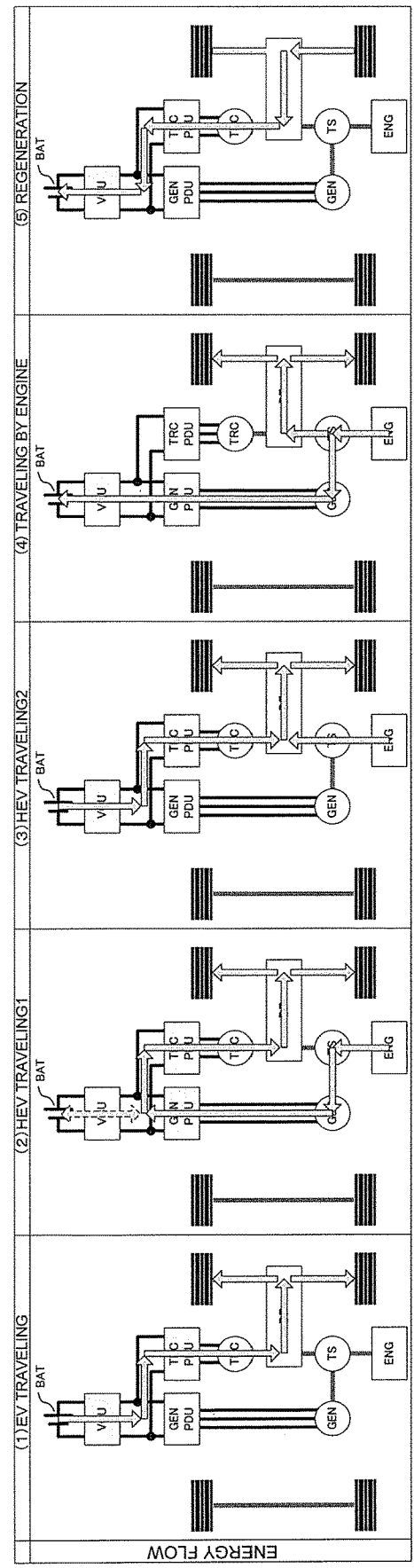
FIG. 19A is an explanatory diagram for illustrating a configuration and an energy flow of an electrically driven vehicle to which the power conversion device according to the third embodiment of the present invention can be applied.
Figure 19A:
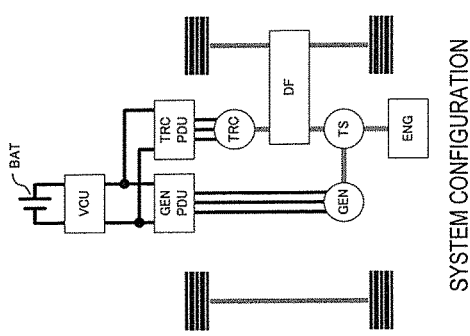
Figure 19B:
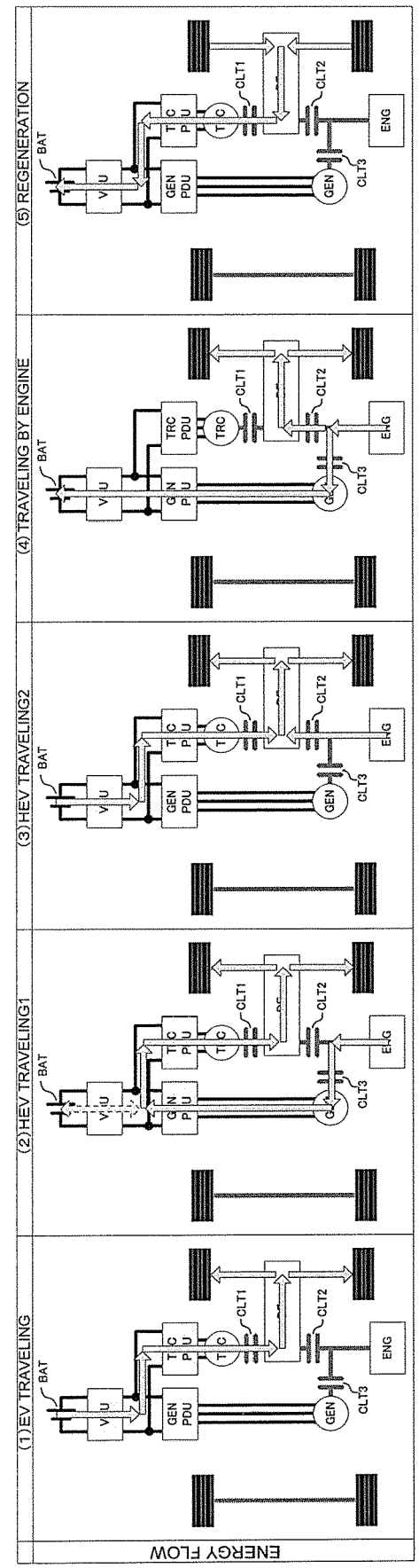
FIG. 19B is an explanatory diagram for illustrating a configuration and an energy flow of an electrically driven vehicle to which the power conversion device according to the third embodiment of the present invention can be applied.
Figure 19B:
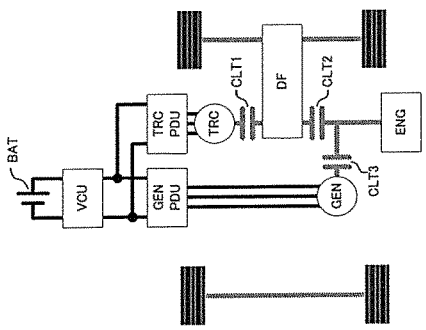

In FIG. 19A and FIG. 19B, configurations of the electrically driven vehicle to which the third embodiment can be applied are illustrated. FIG. 19A is an illustration of a series-parallel HEV including a drive motor TRC, an inverter TRCPDU for the drive motor, a power generation motor GEN, an inverter GENPDU for the power generation motor, the converter VCU, the high voltage battery BAT, the torque splitting mechanism TS configured to split torques of the drive motor TRC, the power generation motor GEN, and the engine ENG, the final gear DF connected to the torque splitting mechanism TS by a shaft, and tires connected to the final gear DF by shafts, and the third embodiment can be applied to the series-parallel HEV.

The drive motor TRC corresponds to the drive motor M1 of FIG. 16, the inverter TRCPDU for the drive motor corresponds to the inverter 100 of FIG. 16, the power generation motor GEN corresponds to the power generation motor G1 of FIG. 16, the inverter GENPDU for the power generation motor corresponds to the inverter 200 of FIG. 16, and the converter VCU corresponds to the DCDC converter 500 of FIG. 16. The torque splitting mechanism TS is, for example, a planetary gear. The third embodiment can also be applied to the PHEV in which the charger OBC (not shown) is connected in parallel to the high voltage battery BAT.

FIG. 19B is an illustration of a series-parallel HEV including the drive motor TRC, the inverter TRCPDU for the drive motor, the power generation motor GEN, the inverter GENPDU for the power generation motor, the converter VCU, the high voltage battery BAT, the engine ENG connected to the power generation motor GEN via a clutch CLT3, the final gear DF connected to the drive motor TRC via the clutch CLT1 and connected to the engine ENG via the clutch CLT2, and the tires connected to the final gear DF by the shafts, and the third embodiment can be applied to the series-parallel HEV.

The drive motor TRC corresponds to the drive motor M1 of FIG. 16, the inverter TRCPDU for the drive motor corresponds to the inverter 100 of FIG. 16, the power generation motor GEN corresponds to the power generation motor G1 of FIG. 16, the inverter GENPDU for the power generation motor corresponds to the inverter 200 of FIG. 16, and the converter VCU corresponds to the DCDC converter 500 of FIG. 16. The third embodiment can also be applied to the PHEV in which the charger OBC (not shown) is connected in parallel to the high voltage battery BAT.

Each of the electrically driven vehicles illustrated in FIG. 19A and FIG. 19B is a front-wheel or rear-wheel drive HEV, but the third embodiment can also be applied to a four-wheel drive HEV obtained by mounting the configuration in each of FIG. 19A and FIG. 19B with a rear-wheel or front-wheel drive motor MOT3 (not shown) and an inverter PDU3 (not shown) for the drive motor of the rear wheels or the front wheels.

In the third embodiment, each of the drive motor TRC and the power generation motor GEN is exemplified by the three-phase winding motor, but the double three-phase winding motor may be employed as one or both of those motors, and in correspondence thereto, the inverter for the double three-phase winding motor may be employed as each of the inverter TRCPDU for the drive motor and the inverter GENPDU for the power generation motor.

As described in the first and second embodiments, by employing the double three-phase winding motor as each of the drive motor TRC and the power generation motor GEN, it is possible to further reduce the power loss of the power conversion device 3 due to the frequency change control for the carrier frequency of the inverter.

In the electrically driven vehicles illustrated in FIG. 19A and FIG. 19B, the wide band gap semiconductor may be used for any one or two of the inverter TRCPDU for the drive motor, the inverter GENPDU for the power generation motor, and the converter VCU, or may be used as every switching element.

In any of the cases, as illustrated in the energy flows of FIG. 19A and FIG. 19B, the component including a switching element is used when the electrically driven vehicle travels, and hence, by using the wide band gap semiconductor as each of the switching elements, it is possible to reduce the power loss of the power conversion device 3 at the time of traveling of the vehicle, and to improve the electricity efficiency and the fuel efficiency of the electrically driven vehicle.

Fourth Embodiment

Figure 20:
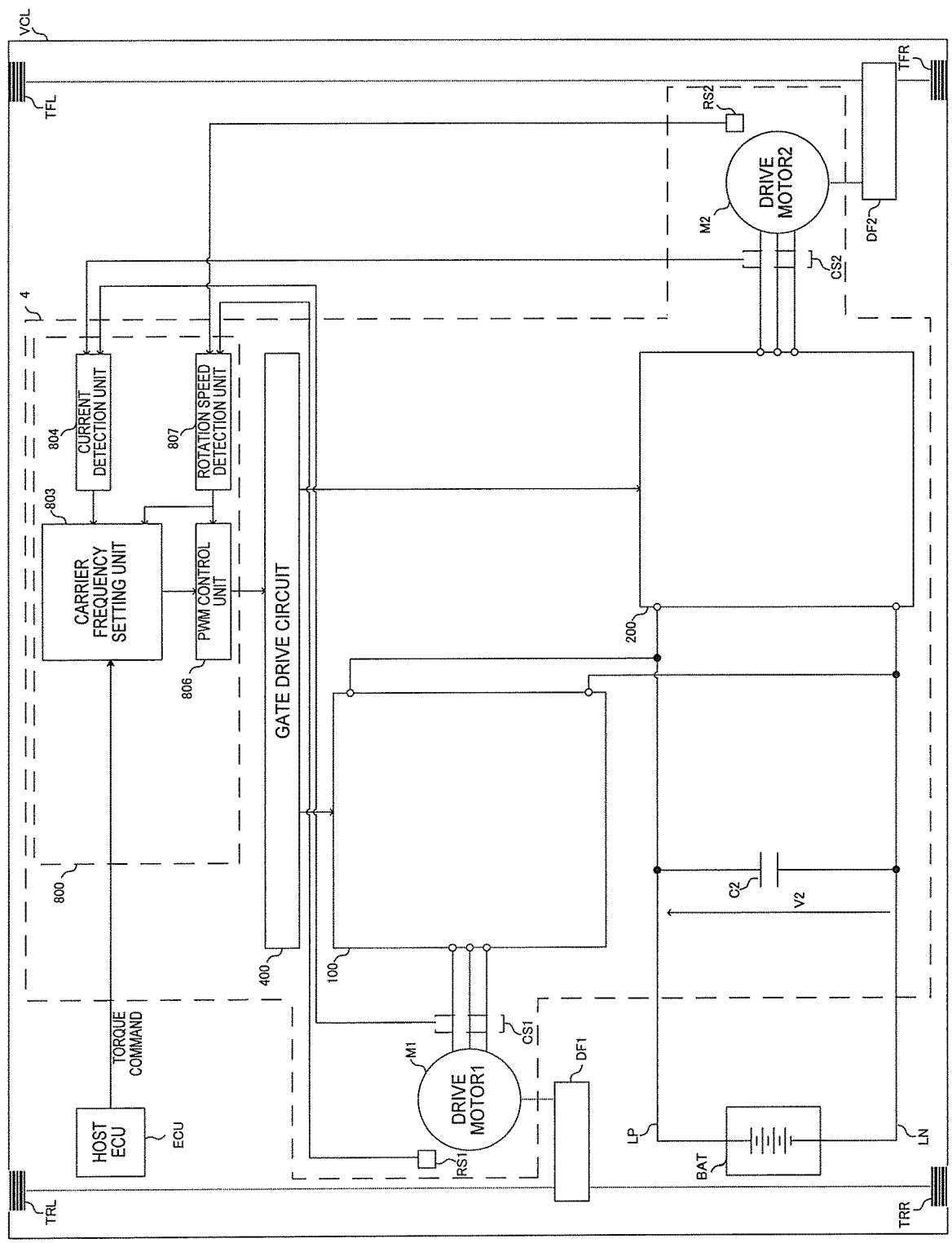
FIG. 20 is a block diagram for illustrating a power conversion device according to a fourth embodiment of the present invention.

FIG. 20 is a block diagram for illustrating a power conversion device according to a fourth embodiment of the present invention. In FIG. 20, a power conversion device 4 is mounted to a vehicle VCL, and is configured to drive a drive motor M1 and a drive motor M2 through use of electric power of a high voltage battery BAT being a DC power supply. The power conversion device 4 also includes a smoothing capacitor C2, an inverter 100, an inverter 200, a current sensor CS1, a current sensor CS2, a rotation speed sensor RS1, a rotation speed sensor RS2, a control device 800, and a gate drive circuit 400.

In this case, each of the switching elements being the power semiconductor elements that form the inverter 100 is a chip of a wide band gap semiconductor element formed of, for example, silicon carbide, gallium nitride-based material, or diamond, and the drive motor M1 is driven by the inverter 100.

In addition, each of the switching elements being the power semiconductor elements that form the inverter 200 is a chip of a wide band gap semiconductor element formed of, for example, silicon carbide, gallium nitride-based material, or diamond, and the drive motor M2 is driven by the inverter 200. The configurations of the inverter 100 and the inverter 200 are the same as those of the first and second embodiments, and are therefore omitted herein.

As the high voltage battery BAT, for example, a nickel metal hydride battery, a lithium ion battery, a lead acid battery, or other such secondary battery can be used. In addition, for example, a large capacity capacitor, a fuel cell, a sodium sulfur battery, or a metal-air battery may be used together with the secondary battery or in place of the secondary battery.

The inverter 100 receives the power supply potential V2 from the high voltage battery BAT to drive the drive motor M1. It is preferred that, during the braking of the vehicle VCL, the inverter 100 perform the regenerative operation by the drive motor M1, that is, use the drive motor M1 as the power generator to return the electric power generated by the drive motor M1 to the high voltage battery BAT.

The inverter 200 receives the power supply potential V2 from the high voltage battery BAT to drive the drive motor M2. It is preferred that, during the braking of the vehicle VCL, the inverter 200 perform the regenerative operation by the drive motor M2, that is, use the drive motor M2 as the power generator to return the electric power generated by the drive motor M2 to the high voltage battery BAT.

The smoothing capacitor C2 is connected between the positive electrode side electric wire LP and the negative electrode side electric wire LN, and smooths the DC voltage between the positive electrode side electric wire LP and the negative electrode side electric wire LN, which is a so-called system voltage.

A plurality of gate drive circuits 400 are provided in correspondence to the respective plurality of switching elements, and drive the corresponding switching elements. A gate terminal being a control terminal of each of the switching elements is connected to the corresponding one of the gate drive circuits 400.

The gate drive circuits 400 each output an on voltage signal or an off voltage signal to the corresponding switching element in accordance with an instruction to turn on or off each of the switching elements, which has been transmitted from the control device 800 via, for example, a photocoupler (not shown), to thereby switch the switching element into an on state or an off state.

The current sensor CS1 detects the current I1 flowing through the winding of the drive motor M1 from the inverter 100. A plurality of, for example, three or two current sensors CS1 are provided on electric wires connecting between the inverter 100 and the windings of the respective phases of the drive motor M1. An output signal from the current sensor CS1 is input to the control device 800.

The current sensor CS2 detects the current I2 flowing through the winding of the drive motor M2 from the inverter 200. A plurality of, for example, three or two current sensors CS2 are provided on electric wires connecting between the inverter 200 and the windings of the respective phases of the drive motor M2. An output signal from the current sensor CS2 is input to the control device 800.

The rotation speed sensor RS1 detects the rotation speed and the rotation angle, that is, the magnetic pole position, of the rotor of the drive motor M1. The rotation speed sensor RS1 is mounted to the rotary shaft of the rotor. As the rotation speed sensor RS1, for example, a resolver or a rotary encoder is used. An output signal from the rotation speed sensor RS1 is input to the control device 800.

The rotation speed sensor RS2 detects a rotation speed and the rotation angle, that is, a magnetic pole position, of the rotor of the drive motor M2. The rotation speed sensor RS2 is mounted to the rotary shaft of the rotor. As the rotation speed sensor RS2, for example, a resolver or a rotary encoder is used. An output signal from the rotation speed sensor RS2 is input to the control device 800.

The control device 800 controls the drive motor M1 by controlling the inverter 100, and controls the drive motor M2 by controlling the inverter 200. The control device 800 includes a carrier frequency setting unit 803, a current detection unit 804, a PWM control unit 806, and a rotation speed detection unit 807.

The current detection unit 804 detects the current I1 flowing through the winding of the drive motor M1 from the inverter 100. The current detection unit 804 detects the current I1 flowing through the winding of each of the phases of the drive motor M1 based on the output signal from the current sensor CS1 input to the control device 800.

The current detection unit 804 also detects the current I2 flowing through the winding of the drive motor M2 from the inverter 200. The current detection unit 804 detects the current I2 flowing through the winding of each of the phases of the drive motor M2 based on the output signal from the current sensor CS2 input to the control device 800.

The rotation speed detection unit 807 detects the rotation speed of the drive motor M1. The rotation speed detection unit 807 detects the rotation speed and the rotation angle, that is, the magnetic pole position, of the rotor of the drive motor M1 based on the output signal from the rotation speed sensor RS1.

The rotation speed detection unit 807 also detects the rotation speed of the drive motor M2. The rotation speed detection unit 807 detects the rotation speed and the rotation angle, that is, the magnetic pole position, of the rotor of the drive motor M2 based on the output signal from the rotation speed sensor RS2.

The carrier frequency setting unit 803 sets the carrier frequency Fc of the carrier wave to be used for the PWM control. The carrier frequency setting unit 803 also receives input of a torque command value from a host ECU. The carrier frequency setting unit 803 executes the frequency change control for changing the carrier frequency Fc to a higher level as a torque load or a current load on the drive motor M1 becomes larger.

That is, the carrier frequency setting unit 803 executes the frequency change control for changing the carrier frequency Fc to a higher level as the torque command value output from the host ECU becomes larger or as the current flowing through the drive motor M1, which is detected by the current detection unit 804, becomes larger.

Figure 21:
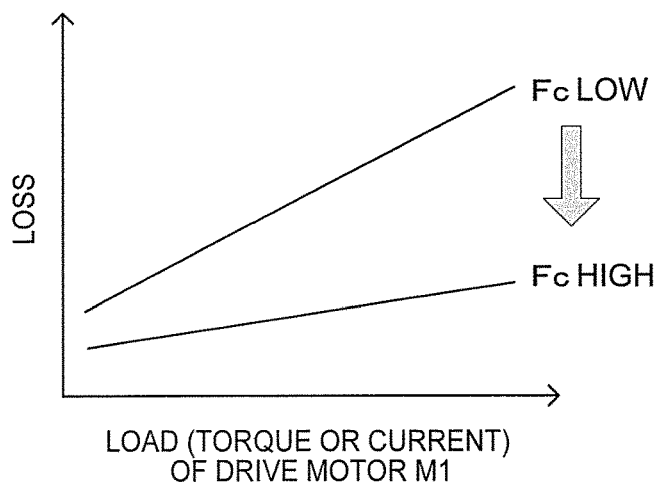
FIG. 21 is an explanatory graph for showing a relationship between a torque load or a current load and a loss of a drive motor, which is exhibited by the power conversion device according to the fourth embodiment of the present invention.

Specifically, as shown in FIG. 21, the power loss of the drive motor M1, which depends on the carrier frequency Fc, becomes higher as the torque load or the current load on the drive motor M1 becomes larger. Therefore, by increasing the carrier frequency Fc as the torque load or the current load on the drive motor M1 becomes larger, it is possible to effectively reduce the power loss of the drive motor M1.

Figure 22A:
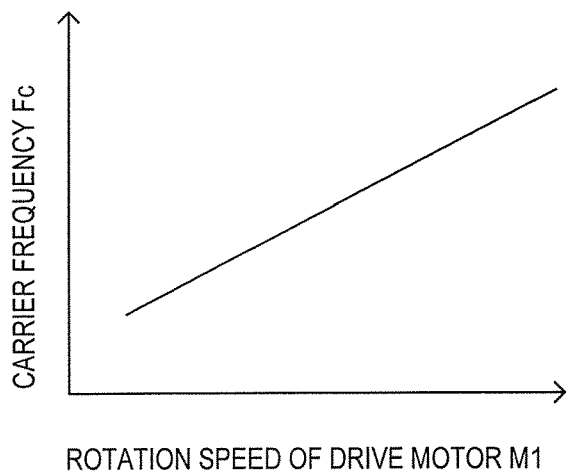
FIG. 22A is an explanatory graph for exemplifying frequency change control to be performed by the power conversion device according to the fourth embodiment of the present invention.
Figure 22B:
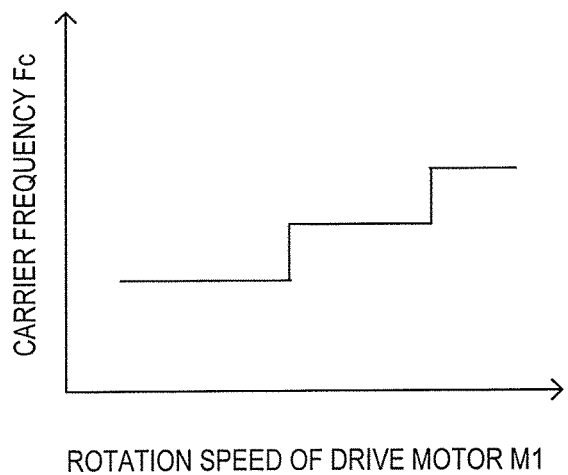
FIG. 22B is an explanatory graph for exemplifying the frequency change control to be performed by the power conversion device according to the fourth embodiment of the present invention.

For example, the carrier frequency setting unit 803 executes the frequency change control so as to change, depending on the torque load or the current load on the drive motor M1, the carrier frequency Fc to have a linear shape as shown in FIG. 22A or the carrier frequency Fc stepwise as shown in FIG. 18B.

The PWM control unit 806 performs the PWM control to subject the plurality of switching elements to the switching control. In this case, the PWM control represents pulse width modulation control. In the PWM control, the PWM control unit 806 compares the carrier wave of the carrier frequency Fc and an AC voltage command signal of each phase with each other, to thereby change a duty cycle of a rectangular pulse wave for turning on or off the switching element of each phase.

The PWM control unit 806 performs the current feedback control for performing the PWM control so that the current I1 flowing through the winding of the drive motor M1 becomes closer to the current command value. Meanwhile, the PWM control unit 806 performs the current feedback control for performing the PWM control so that the current I2 flowing through the winding of the drive motor M2 becomes closer to the current command value.

In the fourth embodiment, the wide band gap semiconductor element is used as each of the switching elements of the inverter 100 and the inverter 200. This is because a loss of the switching element can be reduced to a level lower than that of a Si-IGBT element, which has hitherto been adopted, and because the carrier frequency can be enhanced. This enables the power conversion device 4 mounted to the vehicle VCL to become highly efficient, and hence it is possible to improve electricity efficiency of the vehicle VCL.

In the fourth embodiment, the carrier frequency setting unit 803 changes the carrier frequency for driving the inverter 100 depending on the torque load or the current load on the drive motor M1, but the same effect can be produced even by instead changing the carrier frequency for driving the inverter 200 depending on the torque load or the current load on the drive motor M2.

In addition, the carrier frequency setting unit 803 changes the carrier frequency for driving the inverter 100 depending on the torque load or the current load on the drive motor M1 and changes the carrier frequency for driving the inverter 200 depending on the torque load or the current load on the drive motor M2, to thereby enable the power conversion device 4 mounted to the vehicle VCL to become more highly efficient, and hence it is possible to further improve the electricity efficiency of the vehicle VCL.

Figure 23A:
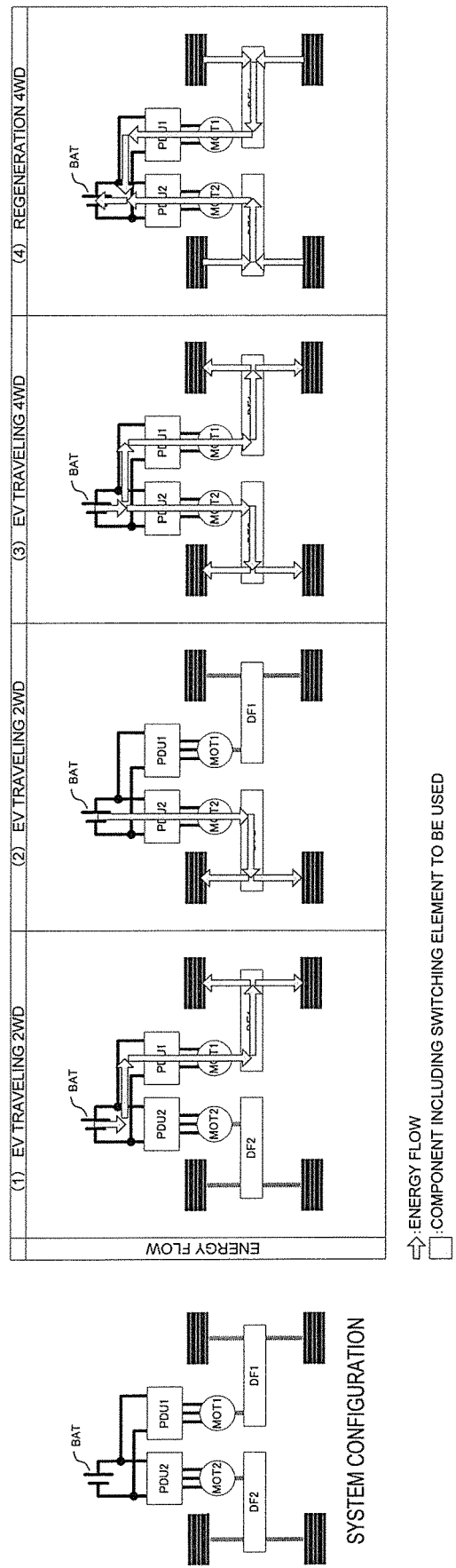
FIG. 23A is an explanatory diagram for illustrating a configuration and an energy flow of an electrically driven vehicle to which the power conversion device according to the fourth embodiment of the present invention can be applied.
Figure 23B:
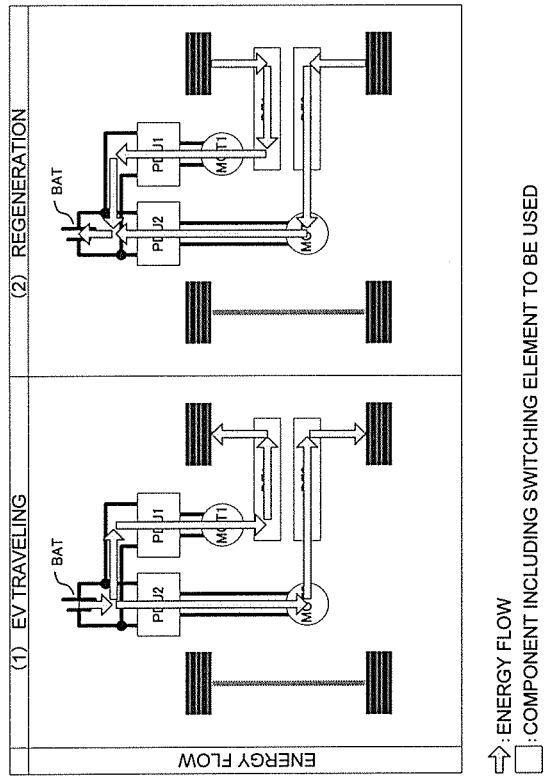
FIG. 23B is an explanatory diagram for illustrating a configuration and an energy flow of an electrically driven vehicle to which the power conversion device according to the fourth embodiment of the present invention can be applied.
Figure 23B:
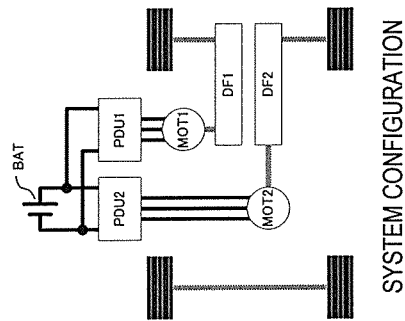

In FIG. 23, configurations of the electrically driven vehicle to which the fourth embodiment can be applied are illustrated. FIG. 23A is an illustration of an EV including a drive motor MOT1, an inverter PDU1, a drive motor MOT2, an inverter PDU2, a final gear DF1 connected to the drive motor MOT1 by a shaft, rear-wheel tires connected to the final gear DF1 by shafts, a final gear DF2 connected to the drive motor MOT2 by a shaft, and front-wheel tires connected to the final gear DF2 by shafts, and the fourth embodiment can be applied to the EV.

The drive motor MOT1 corresponds to the drive motor M1 of FIG. 20, the inverter PDU1 corresponds to the inverter 100 of FIG. 20, the drive motor MOT2 corresponds to the drive motor M2 of FIG. 20, and the inverter PDU2 corresponds to the drive motor M2 of FIG. 20. The fourth embodiment can also be applied to an FCV in which the fuel cell (not shown) is employed as the high voltage battery BAT.

The fourth embodiment can also be applied to an HEV obtained by mounting the configuration of FIG. 23A with an engine (not shown), a torque splitting mechanism (not shown), or a clutch (not shown). Further, the fourth embodiment can also be applied to the PHEV in which the charger OBC (not shown) is connected in parallel to the high voltage battery BAT.

FIG. 23B is an illustration of an EV including a drive motor MOT1, an inverter PDU1, a drive motor MOT2, an inverter PDU2, a final gear DF1 connected to the drive motor MOT1 by a shaft, a right rear-wheel or front-wheel tire connected to the final gear DF1 by a shaft, a final gear DF2 connected to the drive motor MOT2 by a shaft, and a left rear-wheel or front-wheel tire connected to the final gear DF2 by a shaft, and the fourth embodiment can be applied to the EV.

The drive motor MOT1 corresponds to the drive motor M1 of FIG. 20, the inverter PDU1 corresponds to the inverter 100 of FIG. 20, the drive motor MOT2 corresponds to the drive motor M2 of FIG. 20, and the inverter PDU2 corresponds to the drive motor M2 of FIG. 20. The fourth embodiment can also be applied to an FCV in which the fuel cell (not shown) is employed as the high voltage battery BAT.

The fourth embodiment can also be applied to an EV in which the drive motors MOT1 and MOT2 are formed of in-wheel motors that do not include the final gears DF1 and DF2. In addition, the fourth embodiment can be applied to an EV obtained by mounting the configuration of FIG. 23B with the drive motor MOT3 (not shown) and the inverter PDU3 (not shown) to enable four-wheel drive for driving the front wheels or the rear wheels.

The fourth embodiment can also be applied to an EV obtained by mounting the configuration of FIG. 23B with the drive motors MOT3 (not shown) and MOT4 (not shown)

and the inverters PDU3 (not shown) and PDU4 (not shown) to enable the four-wheel drive.

In the fourth embodiment, each of the drive motor MOT1 and the drive motor MOT2 is exemplified by the three-phase winding motor, but the double three-phase winding motor may be employed as one or both of those motors, and in correspondence thereto, the inverter for the double three-phase winding motor may be employed as each of the inverter PDU1 and the inverter PDU2.

As described in the first and second embodiments, by employing the double three-phase winding motor as each of the drive motor MOT1 and the drive motor MOT2, it is possible to further reduce the power loss of the power conversion device 4 due to the frequency change control for the carrier frequency of the inverter.

In the electrically driven vehicles illustrated in FIG. 23, the wide band gap semiconductor may be used for any one of the inverter PDU1 and the inverter PDU2, or may be used as every switching element.

In any of the cases, as illustrated in the energy flows of FIG. 23, the component including a switching element is used when the electrically driven vehicle travels, and hence, by using the wide band gap semiconductor as each of the switching elements, it is possible to reduce the power loss of the power conversion device 4 at the time of traveling of the vehicle, and to improve the electricity efficiency and the fuel efficiency of the electrically driven vehicle.

Fifth Embodiment

Figure 24A:
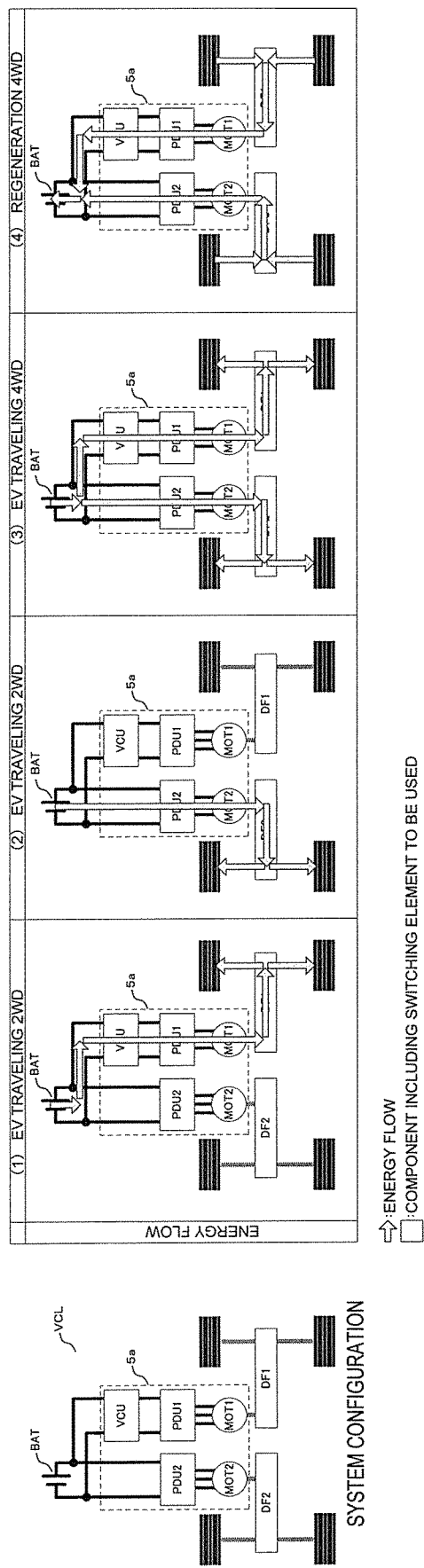
FIG. 24A is an explanatory diagram for illustrating a configuration and an energy flow of an electrically driven vehicle to which a power conversion device according to a fifth embodiment of the present invention can be applied.
Figure 24B:
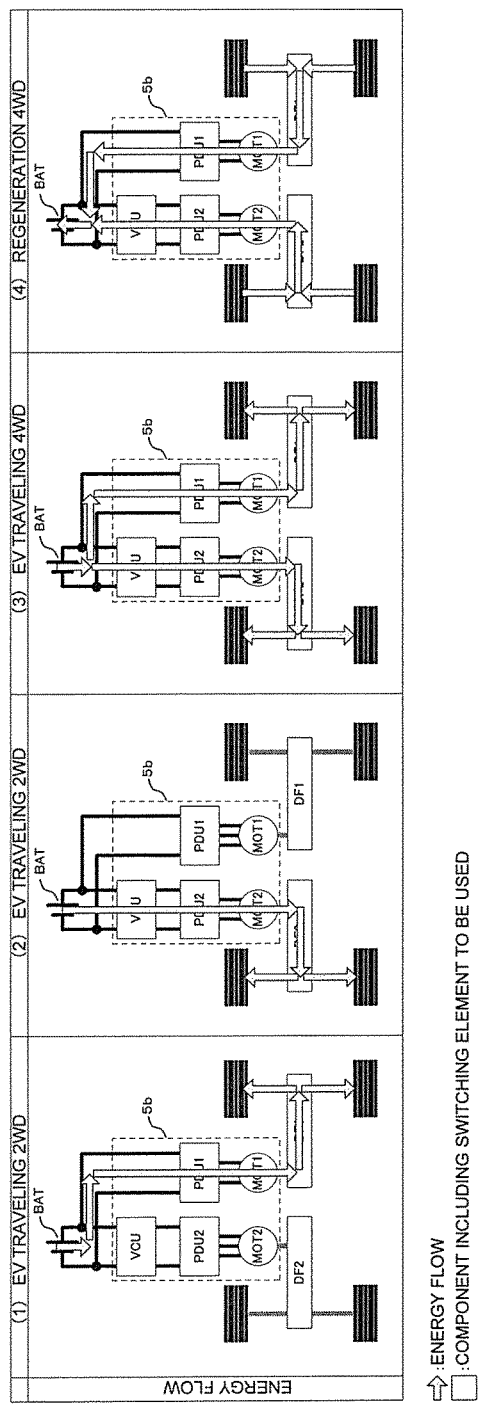
FIG. 24B is an explanatory diagram for illustrating a configuration and an energy flow of an electrically driven vehicle to which the power conversion device according to the fifth embodiment of the present invention can be applied.

An electrically driven vehicle to which a power conversion device 5 according to a fifth embodiment of the present invention can be applied, which is illustrated in each of FIG. 24A and FIG. 24B, is mounted to the vehicle VCL, is configured to drive the drive motor MOT1 and the drive motor MOT2 through use of the electric power of the high voltage battery BAT, and includes the inverter PDU1, the inverter PDU2, the converter VCU, the final gear DF1 connected to the drive motor MOT1 by a shaft, the rear-wheel tires connected to the final gear DF1 by shafts, the final gear DF2 connected to the drive motor MOT2 by a shaft, and the front-wheel tires connected to the final gear DF2 by shafts.

Figure 24B:
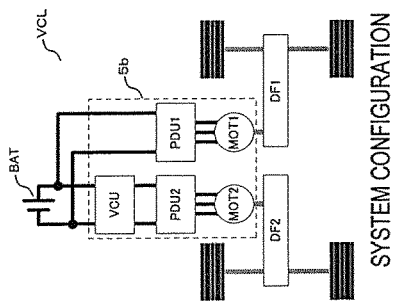

The inverter PDU1 and the inverter PDU2 illustrated in FIG. 24 have the same configurations as that of the inverter 100 or the inverter 200 described in the first to fourth embodiments. The converter VCU has the same configuration as that of the DCDC converter 500 described in the second embodiment.

In the electrically driven vehicle illustrated in FIG. 24, the wide band gap semiconductor may be used for any one or two of the inverter PDU1, the inverter PDU2, and the converter VCU, or may be used as every switching element.

In any of the cases, as illustrated in the energy flows of FIG. 24, the component including a switching element is used when the electrically driven vehicle travels, and hence, by using the wide band gap semiconductor as each of the switching elements, it is possible to reduce the power loss of the power conversion device 5 at the time of traveling of the vehicle, and to improve the electricity efficiency and the fuel efficiency of the electrically driven vehicle.

It is preferred to use the wide band gap semiconductor as the switching element mounted to one of the inverter PDU1 and the inverter PDU2 that is higher in use frequency. Further, the wide band gap semiconductor may be used as the switching element mounted to the converter connected to the inverter that is higher in use frequency. With this configuration, it is possible to efficiently reduce the power loss of the power conversion device 5.

The vehicle illustrated in FIG. 24 is the EV, but the fifth embodiment can also be applied to an FCV that employs the high voltage battery BAT as the fuel cell (not shown). The fifth embodiment can also be applied to an HEV obtained by mounting the configuration of FIG. 24 with an engine (not shown), a torque splitting mechanism (not shown), or a clutch (not shown). Further, the fifth embodiment can also be applied to the PHEV in which the charger OBC (not shown) is connected in parallel to the high voltage battery BAT.

Further, the frequency change control for the carrier frequency of the inverter described in each of the first to fourth embodiments may be applied to the power conversion device 5 of the fifth embodiment. With this configuration, it is possible to reduce the power loss of the power conversion device 5.

Further, the double three-phase winding motor may be employed as one or both of the drive motor MOT1 and the drive motor MOT2, and in correspondence thereto, the inverter for the double three-phase winding motor may be employed as each of the inverter PDU1 and the inverter PDU2.

As described in the first and second embodiments, by employing the double three-phase winding motor as each of the drive motor MOT1 and the drive motor MOT2, it is possible to further reduce the power loss of the power conversion device 5 due to the frequency change control for the carrier frequency of the inverter. It is preferred to employ the double three-phase winding motor as one of the drive motor MOT1 and the drive motor MOT2 that is higher in use frequency. With this configuration, it is possible to efficiently reduce the power loss of the power conversion device 5.

Sixth Embodiment

Figure 25A:
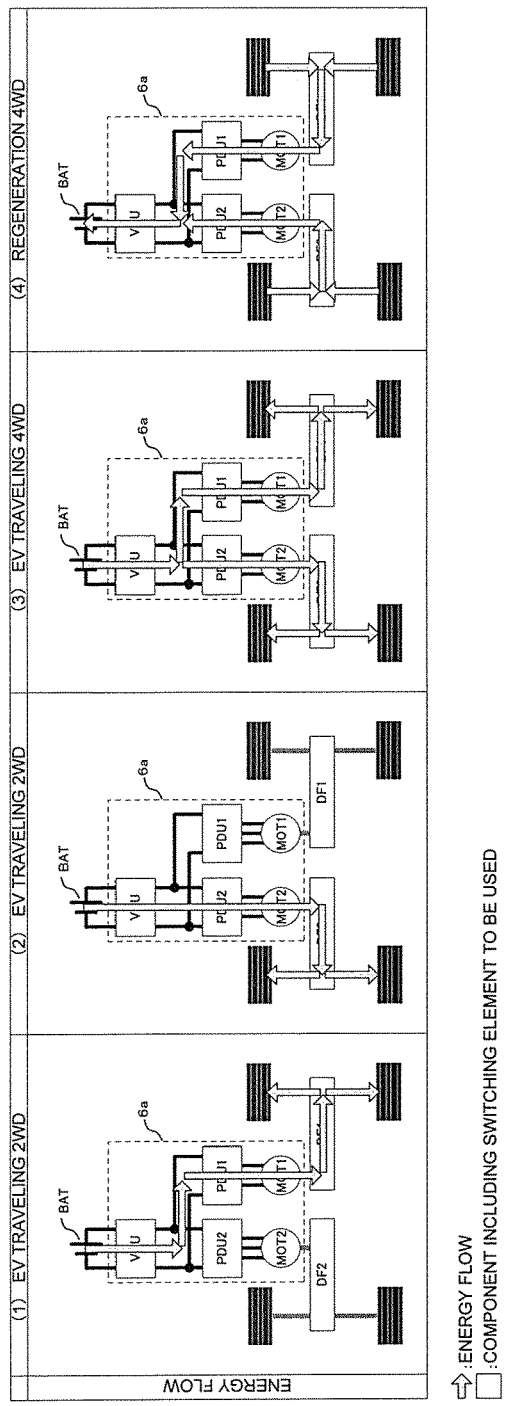
FIG. 25A is an explanatory diagram for illustrating a configuration and an energy flow of an electrically driven vehicle to which a power conversion device according to a sixth embodiment of the present invention can be applied.
Figure 25A:
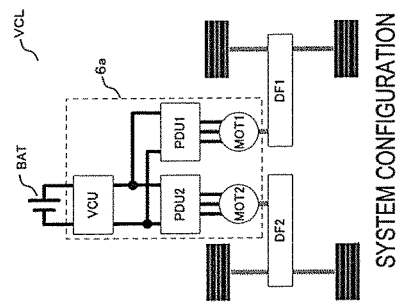

An electrically driven vehicle to which a power conversion device 6 according to a sixth embodiment of the present invention can be applied, which is illustrated in FIG. 25A, is mounted to the vehicle VCL, is configured to drive the drive motor MOT1 and the drive motor MOT2 through use of the electric power of the high voltage battery BAT, and includes the inverter PDU1, the inverter PDU2, the converter VCU, the final gear DF1 connected to the drive motor MOT1 by a shaft, the rear-wheel tires connected to the final gear DF1 by shafts, the final gear DF2 connected to the drive motor MOT2 by a shaft, and the front-wheel tires connected to the final gear DF2 by shafts.

Figure 25B:
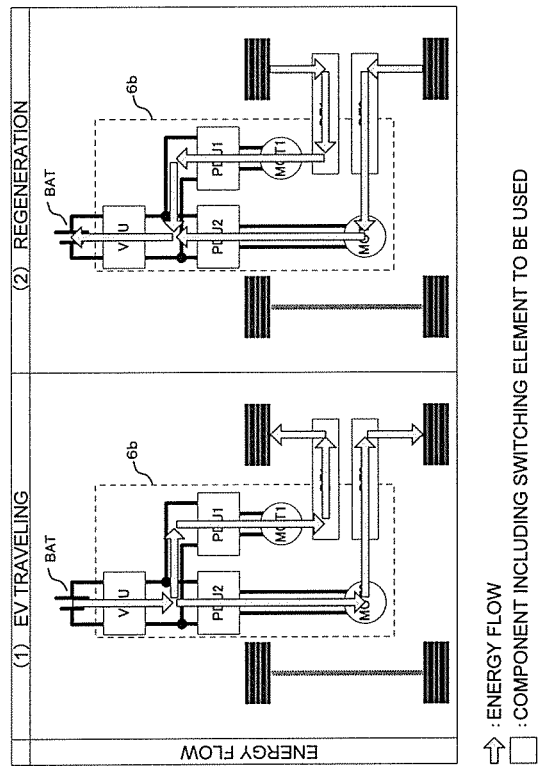
FIG. 25B is an explanatory diagram for illustrating a configuration and an energy flow of an electrically driven vehicle to which the power conversion device according to the sixth embodiment of the present invention can be applied.
Figure 25B:
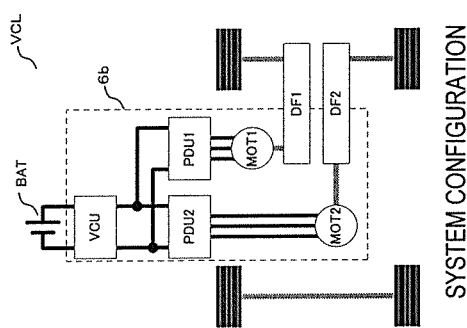

Meanwhile, FIG. 25B includes the drive motor MOT1, the inverter PDU1, the drive motor MOT2, the inverter PDU2, the converter VCU, the final gear DF1 connected to the drive motor MOT1 by the shaft, a right rear-wheel or front-wheel tire connected to the final gear DF1 by a shaft, the final gear DF2 connected to the drive motor MOT2 by the shaft, and a left rear-wheel or front-wheel tire connected to the final gear DF2 by a shaft.

The inverter PDU1 and the inverter PDU2 illustrated in FIG. 25 have the same configurations as that of the inverter 100 or the inverter 200 described in the first to fourth embodiments. The converter VCU has the same configuration as that of the DCDC converter 500 described in the second embodiment.

In the electrically driven vehicle illustrated in FIG. 25, the wide band gap semiconductor may be used for any one or two of the inverter PDU1, the inverter PDU2, and the converter VCU, or may be used as every switching element.

In any of the cases, as illustrated in the energy flows of FIG. 25, the component including a switching element is used when the electrically driven vehicle travels, and hence, by using the wide band gap semiconductor as each of the switching elements, it is possible to reduce the power loss of the power conversion device 6 at the time of traveling of the vehicle, and to improve the electricity efficiency and the fuel efficiency of the electrically driven vehicle.

It is preferred to use the wide band gap semiconductor as the switching element mounted to one of the inverter PDU1 and the inverter PDU2 that is higher in use frequency. Further, the wide band gap semiconductor may be used as the switching element mounted to the converter connected to the inverter that is higher in use frequency. With this configuration, it is possible to efficiently reduce the power loss of the power conversion device 6.

The vehicle illustrated in FIG. 25 is the EV, but the sixth embodiment can also be applied to an FCV that employs the high voltage battery BAT as the fuel cell (not shown). The sixth embodiment can also be applied to an HEV obtained by mounting the configuration of FIG. 25 with an engine (not shown), a torque splitting mechanism (not shown), or a clutch (not shown). Further, the sixth embodiment can also be applied to the PHEV in which the charger OBC (not shown) is connected in parallel to the high voltage battery BAT.

The sixth embodiment can also be applied to an EV in which the drive motors MOT1 and MOT2 are formed of in-wheel motors that do not include the final gears DF1 and DF2. In addition, the sixth embodiment can be applied to an EV obtained by mounting the configuration of FIG. 25B with the drive motor MOT3 (not shown) and the inverter PDU3 (not shown) to enable four-wheel drive for driving the front wheels or the rear wheels.

The sixth embodiment can also be applied to an EV obtained by mounting the configuration of FIG. 25B with the drive motors MOT3 (not shown) and MOT4 (not shown) and the inverters PDU3 (not shown) and PDU4 (not shown) to enable the four-wheel drive.

Further, the frequency change control for the carrier frequency of the inverter described in each of the first to fourth embodiments may be applied to the power conversion device 6 of the sixth embodiment. With this configuration, it is possible to reduce the power loss of the power conversion device 6.

Further, the double three-phase winding motor may be employed as one or both of the drive motor MOT1 and the drive motor MOT2, and in correspondence thereto, the inverter for the double three-phase winding motor may be employed as each of the inverter PDU1 and the inverter PDU2.

As described in the first and second embodiments, by employing the double three-phase winding motor as each of the drive motor MOT1 and the drive motor MOT2, it is possible to further reduce the power loss of the power conversion device 6 due to the frequency change control for the carrier frequency of the inverter. It is preferred to employ the double three-phase winding motor as one of the drive motor MOT1 and the drive motor MOT2 that is higher in use frequency. With this configuration, it is possible to efficiently reduce the power loss of the power conversion device 6.

Seventh Embodiment

Figure 26A:
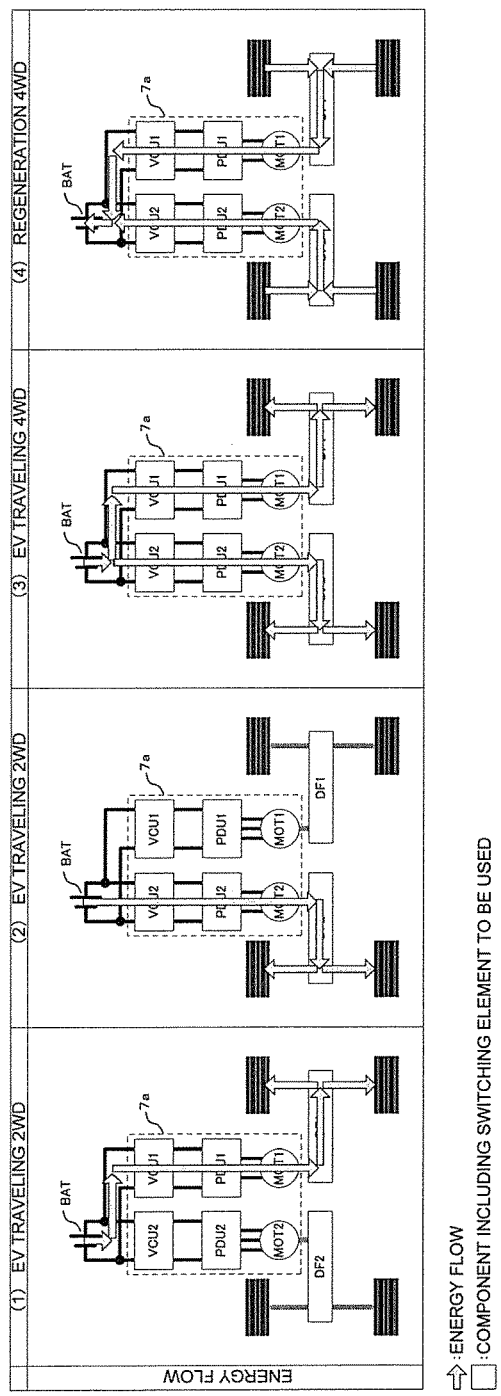
FIG. 26A is an explanatory diagram for illustrating a configuration and an energy flow of an electrically driven vehicle to which a power conversion device according to a seventh embodiment of the present invention can be applied.
Figure 26A:
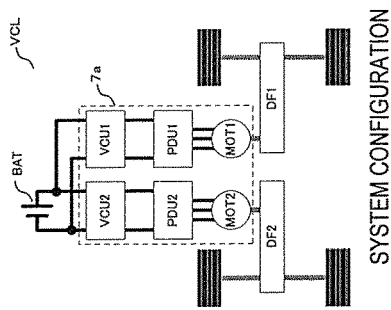

An electrically driven vehicle to which a power conversion device 7 according to a seventh embodiment of the present invention can be applied, which is illustrated in FIG. 26A, is mounted to the vehicle VCL, is configured to drive the drive motor MOT1 and the drive motor MOT2 through use of the electric power of the high voltage battery BAT, and includes the inverter PDU1, the inverter PDU2, the converter VCU1, a converter VCU2, the final gear DF1 connected to the drive motor MOT1 by a shaft, the rear-wheel tires connected to the final gear DF1 by shafts, the final gear DF2 connected to the drive motor MOT2 by a shaft, and the front-wheel tires connected to the final gear DF2 by shafts.

Figure 26B:
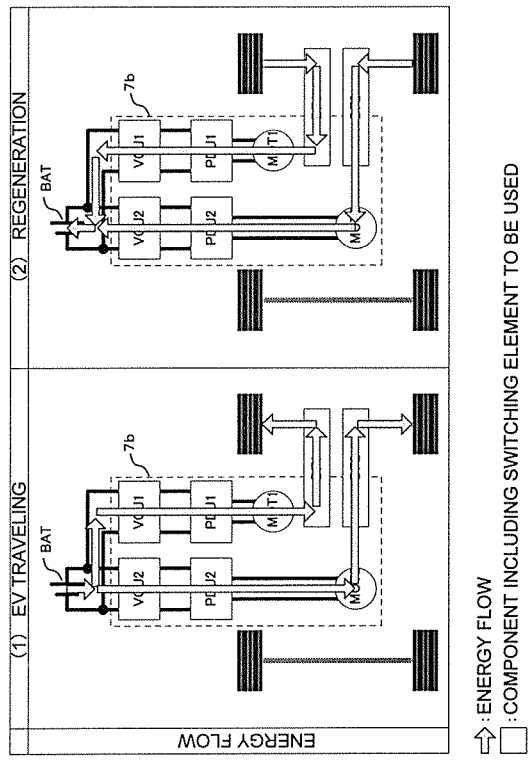
FIG. 26B is an explanatory diagram for illustrating a configuration and an energy flow of an electrically driven vehicle to which the power conversion device according to the seventh embodiment of the present invention can be applied.
Figure 26B:
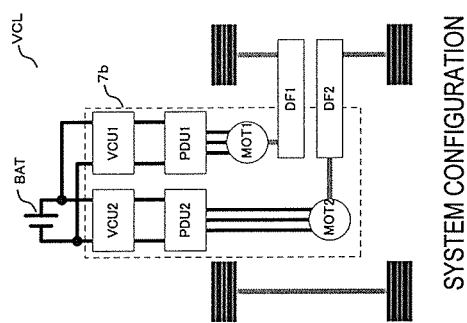

Meanwhile, FIG. 26B includes the drive motor MOT1, the inverter PDU1, the converter VCU1, the drive motor MOT2, the inverter PDU2, the converter VCU2, the final gear DF1 connected to the drive motor MOT1 by the shaft, a right rear-wheel or front-wheel tire connected to the final gear DF1 by a shaft, the final gear DF2 connected to the drive motor MOT2 by the shaft, and a left rear-wheel or front-wheel tire connected to the final gear DF2 by a shaft.

The inverter PDU1 and the inverter PDU2 illustrated in FIG. 26 have the same configurations as that of the inverter 100 or the inverter 200 described in the first to fourth embodiments. The converter VCU1 and the converter VCU2 have the same configuration as that of the DCDC converter 500 described in the second embodiment.

In the electrically driven vehicle illustrated in FIG. 26, the wide band gap semiconductor may be used for any one, two, or three of the inverter PDU1, the inverter PDU2, the converter VCU1, and the converter VCU2, or may be used as every switching element.

In any of the cases, as illustrated in the energy flows of FIG. 26, the component including a switching element is used when the electrically driven vehicle travels, and hence, by using the wide band gap semiconductor as each of the switching elements, it is possible to reduce the power loss of the power conversion device 7 at the time of traveling of the vehicle, and to improve the electricity efficiency and the fuel efficiency of the electrically driven vehicle.

It is preferred to use the wide band gap semiconductor as the switching element mounted to one of the inverter PDU1 and the inverter PDU2 that is higher in use frequency. Further, the wide band gap semiconductor may be used as the switching element mounted to the converter connected to the inverter that is higher in use frequency. With this configuration, it is possible to efficiently reduce the power loss of the power conversion device 7.

The vehicle illustrated in FIG. 26 is the EV, but the seventh embodiment can also be applied to an FCV that employs the high voltage battery BAT as the fuel cell (not shown). The seventh embodiment can also be applied to an HEV obtained by mounting the configuration of FIG. 26 with an engine (not shown), a torque splitting mechanism (not shown), or a clutch (not shown). Further, the seventh embodiment can also be applied to the PHEV in which the charger OBC (not shown) is connected in parallel to the high voltage battery BAT.

The seventh embodiment can also be applied to an EV in which the drive motors MOT1 and MOT2 are formed of in-wheel motors that do not include the final gears DF1 and DF2. In addition, the seventh embodiment can be applied to an EV obtained by mounting the configuration of FIG. 26B with the drive motor MOT3 (not shown) and the inverter PDU3 (not shown) to enable four-wheel drive for driving the front wheels or the rear wheels.

The seventh embodiment can also be applied to an EV obtained by mounting the configuration of FIG. 26B with the drive motors MOT3 (not shown) and MOT4 (not shown)

and the inverters PDU3 (not shown) and PDU4 (not shown) to enable the four-wheel drive.

Further, the frequency change control for the carrier frequency of the inverter described in each of the first to fourth embodiments may be applied to the power conversion device 7 of the seventh embodiment. With this configuration, it is possible to reduce the power loss of the power conversion device 7.

Further, the double three-phase winding motor may be employed as one or both of the drive motor MOT1 and the drive motor MOT2, and in correspondence thereto, the inverter for the double three-phase winding motor may be employed as each of the inverter PDU1 and the inverter PDU2.

As described in the first and second embodiments, by employing the double three-phase winding motor as each of the drive motor MOT1 and the drive motor MOT2, it is possible to further reduce the power loss of the power conversion device 7 due to the frequency change control for the carrier frequency of the inverter. It is preferred to employ the double three-phase winding motor as one of the drive motor MOT1 and the drive motor MOT2 that is higher in use frequency. With this configuration, it is possible to efficiently reduce the power loss of the power conversion device 7.

Eighth Embodiment

Figure 27A:
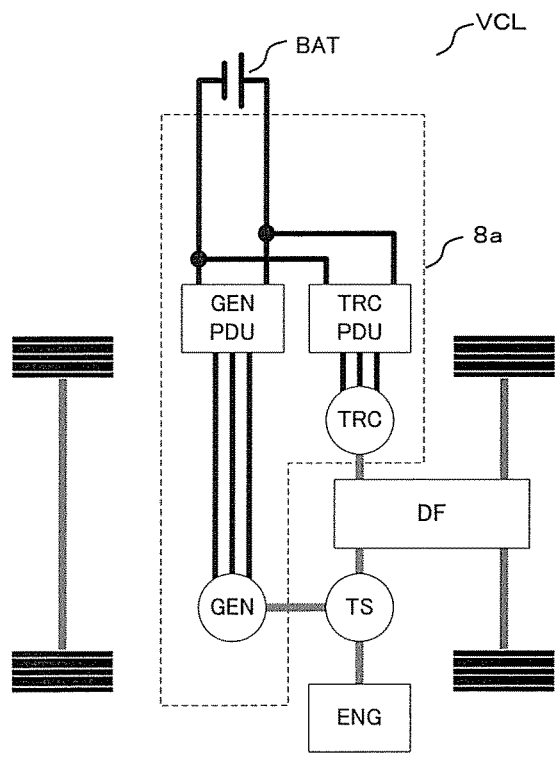
FIG. 27A is a configuration diagram for illustrating an electrically driven vehicle to which a power conversion device according to an eighth embodiment of the present invention can be applied.
Figure 27B:
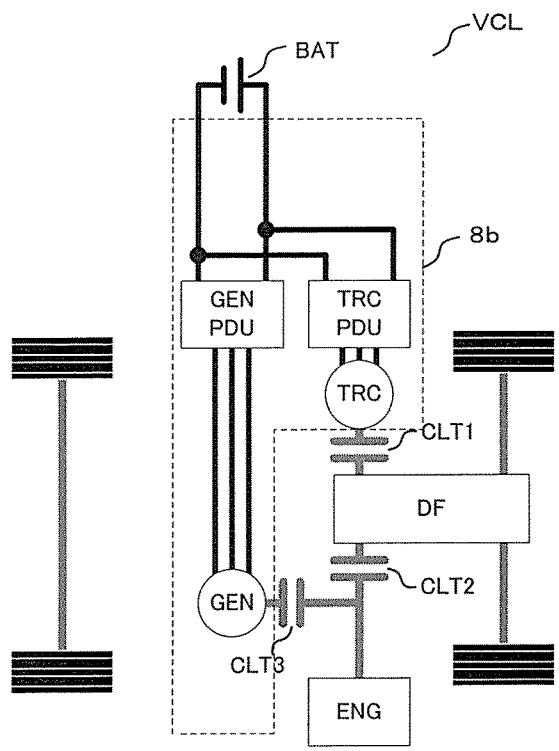
FIG. 27B is a configuration diagram for illustrating an electrically driven vehicle to which the power conversion device according to the eighth embodiment of the present invention can be applied.

An electrically driven vehicle to which a power conversion device 8 according to an eighth embodiment of the present invention can be applied, which is illustrated in each of FIG. 27A and FIG. 27B, is configured such that the high voltage battery BAT is directly connected to each of the inverter TRCPDU for the drive motor and the inverter GENPDU for the power generation motor by excluding the converter VCU from the electrically driven vehicle in the third embodiment of the present invention, which is illustrated in each of FIG. 19A and FIG. 19B.

In the electrically driven vehicle illustrated in FIG. 27, the wide band gap semiconductor may be used for any one of the inverter TRCPDU for the drive motor and the inverter GENPDU for the power generation motor, or may be used as every switching element.

In any of the cases, the component including a switching element is used when the electrically driven vehicle travels, and hence, by using the wide band gap semiconductor as each of the switching elements, it is possible to reduce the power loss of the power conversion device 8 at the time of traveling of the vehicle, and to improve the electricity efficiency and the fuel efficiency of the electrically driven vehicle. The energy flows are similar to those illustrated in FIG. 19A and FIG. 19B, and are therefore omitted herein.

It is preferred to use the wide band gap semiconductor as the switching element mounted to one of the inverter TRCPDU for the drive motor and the inverter GENPDU for the power generation motor that is higher in use frequency. With this configuration, it is possible to efficiently reduce the power loss of the power conversion device 8.

Each of the vehicles illustrated in FIG. 27 is the front-wheel or rear-wheel drive HEV, but the eighth embodiment can also be applied to a four-wheel drive HEV obtained by mounting the configuration of each of FIG. 27 with the rear-wheel or front-wheel drive motor MOT3 (not shown) and the inverter PDU3 (not shown) for the drive motor of the rear wheels or the front wheels. The eighth embodiment can also be applied to the PHEV in which the charger OBC (not shown) is connected in parallel to the high voltage battery BAT.

Further, the frequency change control for the carrier frequency of the inverter described in each of the first to fourth embodiments may be applied to the power conversion device 8 of the eighth embodiment. With this configuration, it is possible to reduce the power loss of the power conversion device 8.

Further, the double three-phase winding motor may be employed as one or both of the drive motor TRC and the power generation motor GEN, and in correspondence thereto, the inverter for the double three-phase winding motor may be employed as each of the inverter TRCPDU for the drive motor and the inverter GENPDU for the power generation motor.

As described in the first and second embodiments, by employing the double three-phase winding motor as each of the drive motor TRC and the power generation motor GEN, it is possible to further reduce the power loss of the power conversion device 8 due to the frequency change control for the carrier frequency of the inverter. It is preferred to employ the double three-phase winding motor as one of the drive motor TRC and the power generation motor GEN that is higher in use frequency. With this configuration, it is possible to efficiently reduce the power loss of the power conversion device 8.

Ninth Embodiment

Figure 28A:
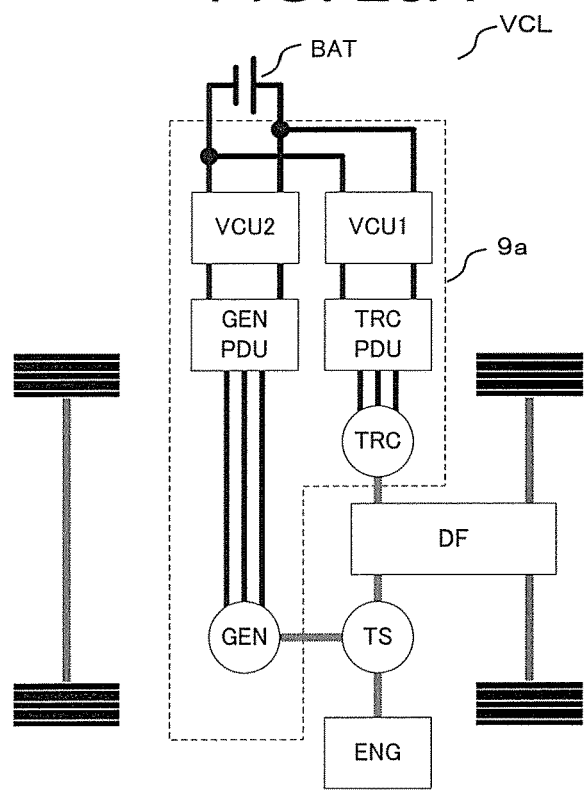
FIG. 28A is a configuration diagram for illustrating an electrically driven vehicle to which a power conversion device according to a ninth embodiment of the present invention can be applied.
Figure 28B:
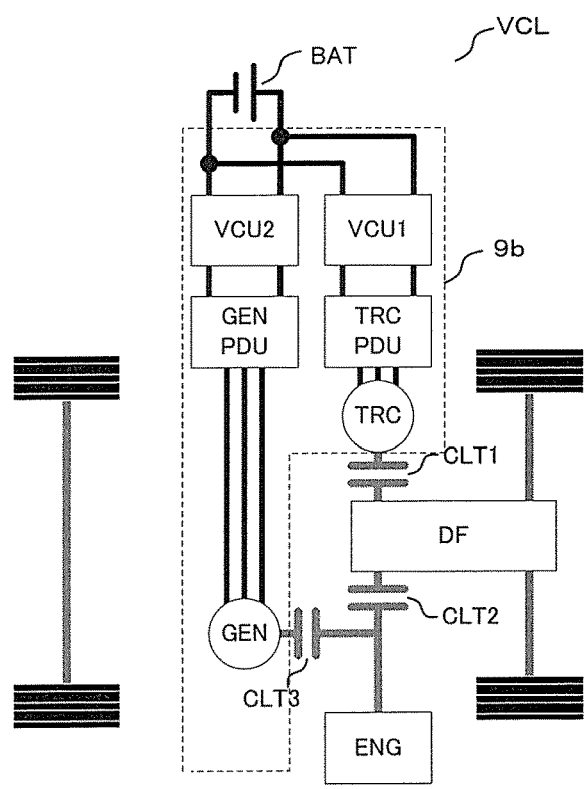
FIG. 28B is a configuration diagram for illustrating an electrically driven vehicle to which the power conversion device according to the ninth embodiment of the present invention can be applied.

An electrically driven vehicle to which a power conversion device 9 according to a ninth embodiment of the present invention can be applied, which is illustrated in each of FIG. 28A and FIG. 28B, is configured such that a converter VCU1 and a converter VCU2 are mounted between the high voltage battery BAT and the inverter TRCPDU for the drive motor and between the high voltage battery BAT and the inverter GENPDU for the power generation motor, respectively, by excluding the converter VCU from the electrically driven vehicle in the third embodiment of the present invention, which is illustrated in each of FIG. 19A and FIG. 19B.

In the electrically driven vehicle illustrated in each of FIG. 28, the wide band gap semiconductor may be used for any one, two, or three of the inverter TRCPDU for the drive motor, the inverter GENPDU for the power generation motor, the converter VCU 1, and the converter VCU 2, or may be used as every switching element.

In any of the cases, the component including a switching element is used when the electrically driven vehicle travels, and hence, by using the wide band gap semiconductor as each of the switching elements, it is possible to reduce the power loss of the power conversion device 9 at the time of traveling of the vehicle, and to improve the electricity efficiency and the fuel efficiency of the electrically driven vehicle. The energy flows are similar to those illustrated in FIG. 19A and FIG. 19B, and are therefore omitted herein.

It is preferred to use the wide band gap semiconductor as the switching element mounted to one of the inverter TRCPDU for the drive motor and the inverter GENPDU for the power generation motor that is higher in use frequency. Further, the wide band gap semiconductor may be used as the switching element mounted to the converter connected to the inverter that is higher in use frequency. With this configuration, it is possible to efficiently reduce the power loss of the power conversion device 9.

Each of the vehicles illustrated in FIG. 28 is the front-wheel or rear-wheel drive HEV, but the ninth embodiment can also be applied to a four-wheel drive HEV obtained by mounting the configuration of each of FIG. 28 with the rear-wheel or front-wheel drive motor MOT3 (not shown) and the inverter PDU3 (not shown) for the drive motor of the rear wheels or the front wheels. The ninth embodiment can also be applied to the PHEV in which the charger OBC (not shown) is connected in parallel to the high voltage battery BAT.

Further, the frequency change control for the carrier frequency of the inverter described in each of the first to fourth embodiments may be applied to the power conversion device 9 of the ninth embodiment. With this configuration, it is possible to reduce the power loss of the power conversion device 9.

Further, the double three-phase winding motor may be employed as one or both of the drive motor TRC and the power generation motor GEN, and in correspondence thereto, the inverter for the double three-phase winding motor may be employed as each of the inverter TRCPDU for the drive motor and the inverter GENPDU for the power generation motor.

As described in the first and second embodiments, by employing the double three-phase winding motor as each of the drive motor TRC and the power generation motor GEN, it is possible to further reduce the power loss of the power conversion device 9 due to the frequency change control for the carrier frequency of the inverter. It is preferred to employ the double three-phase winding motor as one of the drive motor TRC and the power generation motor GEN that is higher in use frequency. With this configuration, it is possible to efficiently reduce the power loss of the power conversion device 9.

Tenth Embodiment

Figure 29A:
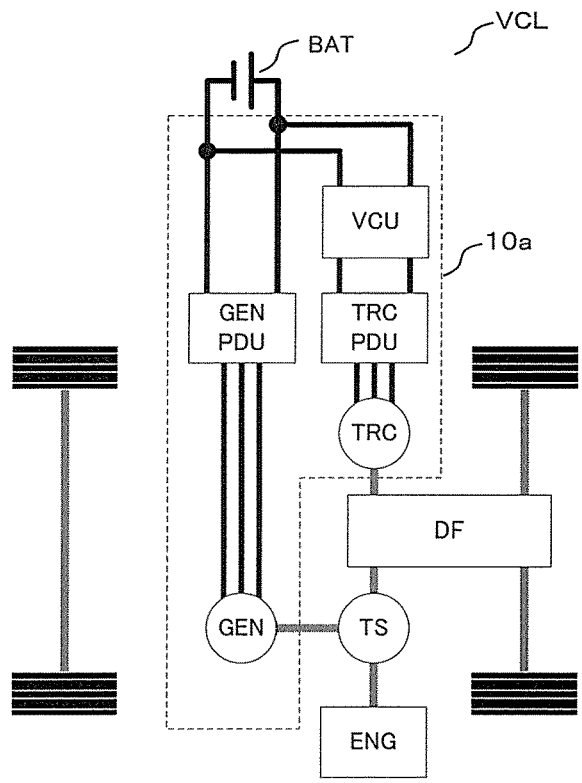
FIG. 29A is a configuration diagram for illustrating an electrically driven vehicle to which a power conversion device according to a tenth embodiment of the present invention can be applied.
Figure 29B:
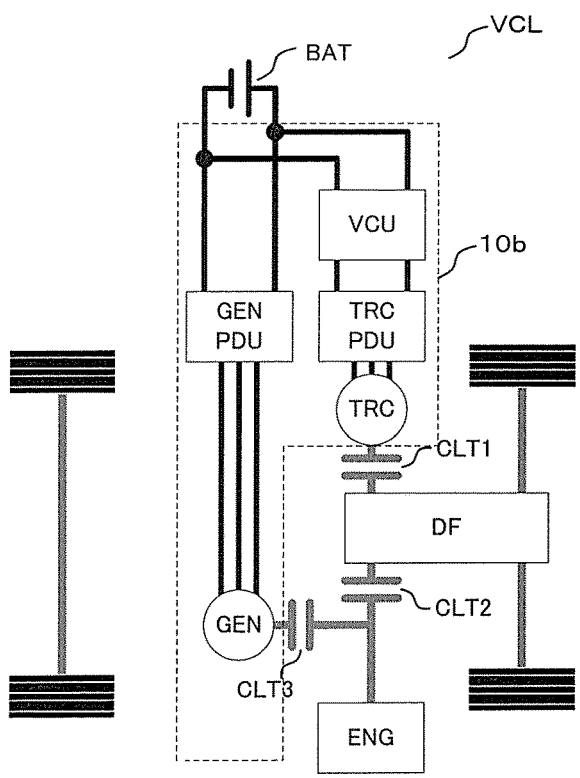
FIG. 29B is a configuration diagram for illustrating an electrically driven vehicle to which the power conversion device according to the tenth embodiment of the present invention can be applied.

An electrically driven vehicle to which a power conversion device 10 according to a tenth embodiment of the present invention can be applied, which is illustrated in each of FIG. 29A and FIG. 29B, is configured such that the converter VCU1 is mounted between the high voltage battery BAT and the inverter TRCPDU for the drive motor, by excluding the converter VCU from the electrically driven vehicle in the third embodiment of the present invention, which is illustrated in each of FIG. 19A and FIG. 19B.

Figure 29C:
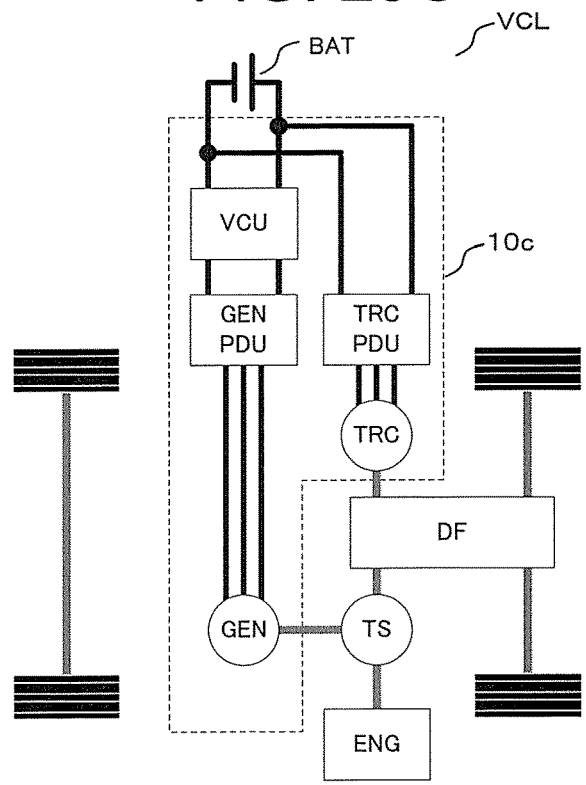
FIG. 29C is a configuration diagram for illustrating an electrically driven vehicle to which the power conversion device according to the tenth embodiment of the present invention can be applied.
Figure 29D:
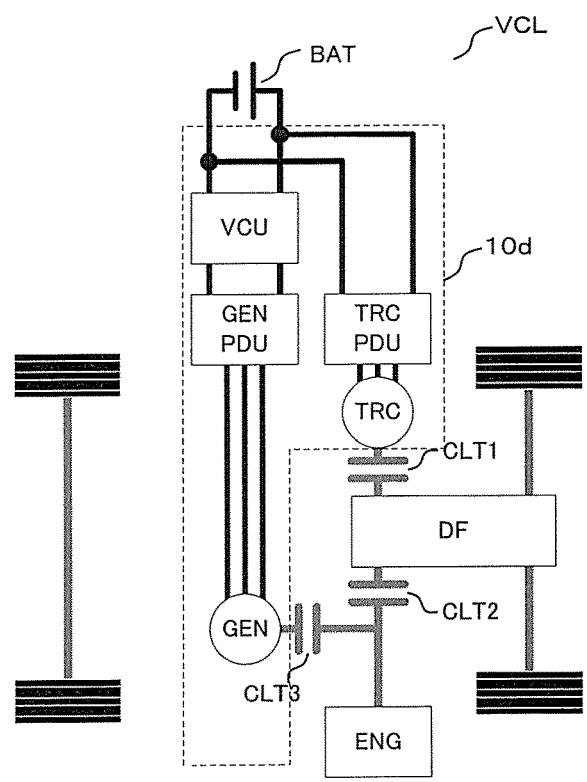
FIG. 29D is a configuration diagram for illustrating an electrically driven vehicle to which the power conversion device according to the tenth embodiment of the present invention can be applied.

Further, an electrically driven vehicle to which a power conversion device 10 according to the tenth embodiment of the present invention can be applied, which is illustrated in each of FIG. 29C and FIG. 29D, is configured such that the converter VCU2 is mounted between the high voltage battery BAT and the inverter GENPDU for the power generation motor, by excluding the converter VCU from the electrically driven vehicle in the third embodiment of the present invention, which is illustrated in each of FIG. 19A and FIG. 19B.

In the electrically driven vehicle illustrated in each of FIG. 29, the wide band gap semiconductor may be used for any one or two of the inverter TRCPDU for the drive motor, the inverter GENPDU for the power generation motor, and the converter VCU, or may be used as every switching element.

In any of the cases, the component including a switching element is used when the electrically driven vehicle travels, and hence, by using the wide band gap semiconductor as each of the switching elements, it is possible to reduce the power loss of the power conversion device 10 at the time of traveling of the vehicle, and to improve the electricity efficiency and the fuel efficiency of the electrically driven vehicle. The energy flows are similar to those described in FIG. 19A and FIG. 19B, and are therefore omitted herein.

It is preferred to use the wide band gap semiconductor as the switching element mounted to one of the inverter TRCPDU for the drive motor and the inverter GENPDU for the power generation motor that is higher in use frequency. Further, the wide band gap semiconductor may be used as the switching element mounted to the converter connected to the inverter that is higher in use frequency. With this configuration, it is possible to efficiently reduce the power loss of the power conversion device 10.

Each of the vehicles illustrated in FIG. 29 is the front-wheel or rear-wheel drive HEV, but the tenth embodiment can also be applied to a four-wheel drive HEV obtained by mounting the configuration of each of FIG. 29 with the rear-wheel or front-wheel drive motor MOT3 (not shown) and the inverter PDU3 (not shown) for the drive motor of the rear wheels or the front wheels. The tenth embodiment can also be applied to the PHEV in which the charger OBC (not shown) is connected in parallel to the high voltage battery BAT.

Further, the frequency change control for the carrier frequency of the inverter described in each of the first to fourth embodiments may be applied to the power conversion device 10 of the tenth embodiment. With this configuration, it is possible to reduce the power loss of the power conversion device 10.

Further, the double three-phase winding motor may be employed as one or both of the drive motor TRC and the power generation motor GEN, and in correspondence thereto, the inverter for the double three-phase winding motor may be employed as each of the inverter TRCPDU for the drive motor and the inverter GENPDU for the power generation motor.

As described in the first and second embodiments, by employing the double three-phase winding motor as each of the drive motor TRC and the power generation motor GEN, it is possible to further reduce the power loss of the power conversion device 10 due to the frequency change control for the carrier frequency of the inverter. It is preferred to employ the double three-phase winding motor as one of the drive motor TRC and the power generation motor GEN that is higher in use frequency. With this configuration, it is possible to efficiently reduce the power loss of the power conversion device 10.

In the power conversion devices 1 to 10 according to the first to tenth embodiments of the present invention, the wide band gap semiconductor is used as each of the switching elements of the inverters PDU, PDU1, PDU2, TRCPDU, and GENPDU and the converters VCU, VCU1, and VCU2, it is possible to reduce the power loss to a level lower than in the case of using the Si-IGBT element, and it is also possible to reduce noise ascribable to the reactors and the capacitors mounted to the power conversion devices 1 to 10 by subjecting the switching element to high frequency drive, specifically, by setting the carrier frequency to a level equal to or higher than the audible range of a human, which is generally equal to or lower than 15 kHz.

Further, in the power conversion devices 1 to 10 according to the first to tenth embodiments of the present invention, by using the wide band gap semiconductor as each of the switching elements of the converters VCU, VCU1, and VCU2, it is possible to subject the switching element to the high frequency drive as compared to the case of using the Si-IGBT element as the switching element, and hence the reactors and the capacitors mounted to the converters VCU, VCU1, and VCU2 can be reduced in size.

REFERENCE SIGNS LIST 1 to 10 power conversion device, 100, 200 inverter, 303 carrier frequency setting unit, 307 rotation speed detection unit, 500 converter, 603 carrier frequency setting unit, 607 rotation speed detection unit, 703 carrier frequency setting unit, 707 rotation speed detection unit, 803 carrier frequency setting unit, 807 rotation speed detection unit

The invention claimed is:

1. A power conversion device, which is to be mounted to a vehicle configured to travel by using a drive motor as a motive power source,
the power conversion device comprising:
an inverter for the drive motor, which is configured to control the drive motor by having a plurality of power semiconductor elements subjected to switching control, and
a carrier frequency setting unit configured to
add a motor loss of the drive motor, which decreases as an applied carrier frequency increases, and an inverter loss of the inverter, which increases as the applied carrier frequency decreases, to obtain a sum of the motor loss and the inverter loss that changes according to the applied carrier frequency, and
set a carrier frequency of the inverter to a frequency at which the sum of the motor loss and the inverter loss has a minimum value,
wherein each of the plurality of power semiconductor elements that form the inverter for the drive motor is formed of a wide band gap semiconductor.

2. The power conversion device according to claim 1, further comprising a DCDC converter configured to raise a DC input voltage based on a voltage command value to generate an output voltage to be applied to the inverter for the drive motor by having a plurality of power semiconductor elements subjected to switching control,
wherein each of the plurality of power semiconductor elements that form at least one of the inverter for the drive motor and the DCDC converter is formed of a wide band gap semiconductor.

3. The power conversion device according to claim 1,
wherein the drive motor includes a first drive motor and a second drive motor,
wherein the inverter for the drive motor includes an inverter for the first drive motor, which is configured to control the first drive motor, and an inverter for the second drive motor, which is configured to control the second drive motor, and
wherein each of the plurality of power semiconductor elements that form at least one of the inverter for the first drive motor and the inverter for the second drive motor is formed of a wide band gap semiconductor.

4. The power conversion device according to claim 3, wherein the first drive motor includes a double three-phase motor.

5. The power conversion device according to claim 3, wherein the second drive motor includes a double three-phase motor.

6. The power conversion device according to claim 3, wherein the first drive motor and the second drive motor each include a double three-phase motor.

7. The power conversion device according to claim 3,
wherein the carrier frequency setting unit is configured to set the carrier frequency so as to minimize a total loss obtained by adding a loss of the first drive motor and a loss of the inverter for the first drive motor.

8. The power conversion device according to claim 3, further comprising:
a motor rotation speed detection unit configured to detect a rotation speed of the first drive motor,
wherein the carrier frequency setting unit is configured to set the carrier frequency to a higher level as the rotation speed of the first drive motor becomes higher.

9. The power conversion device according to claim 3, further comprising:
a motor torque detection unit configured to detect a torque of the first drive motor,
wherein the carrier frequency setting unit is configured to set the carrier frequency to a higher level as the torque of the first drive motor becomes higher.

10. The power conversion device according to claim 3,
wherein the carrier frequency setting unit is configured to set the carrier frequency so as to minimize a total loss obtained by adding a loss of the second drive motor and a loss of the inverter for the second drive motor.

11. The power conversion device according to claim 3, further comprising:
a motor rotation speed detection unit configured to detect a rotation speed of the second drive motor,
wherein the carrier frequency setting unit is configured to set the carrier frequency to a higher level as the rotation speed of the second drive motor becomes higher.

12. The power conversion device according to claim 3, further comprising:
a motor torque detection unit configured to detect a torque of the second drive motor,
wherein the carrier frequency setting unit is configured to set the carrier frequency to a higher level as the torque of the second drive motor becomes higher.

13. The power conversion device according to claim 1, further comprising:
a power generation motor configured to generate power from output of an engine; and
an inverter for the power generation motor, which is configured to control the power generation motor by having a plurality of power semiconductor elements subjected to switching control,
wherein each of the plurality of power semiconductor elements that form at least one of the inverter for the drive motor and the inverter for the power generation motor is formed of a wide band gap semiconductor.

14. The power conversion device according to claim 13, wherein the power generation motor includes a double three-phase motor.

15. The power conversion device according to claim 13, wherein the drive motor and the power generation motor each include a double three-phase motor.

16. The power conversion device according to claim 13,
wherein the carrier frequency setting unit is configured to set the carrier frequency so as to minimize a total loss obtained by adding a loss of the power generation motor and a loss of the inverter for the power generation motor.

17. The power conversion device according to claim 13, further comprising:
a motor rotation speed detection unit configured to detect a rotation speed of the power generation motor, wherein the carrier frequency setting unit is configured to set the carrier frequency to a higher level as the rotation speed of the power generation motor becomes higher.

18. The power conversion device according to claim 13, further comprising:
a motor torque detection unit configured to detect a torque of the power generation motor,
wherein the carrier frequency setting unit is configured to set the carrier frequency to a higher level as the torque of the power generation motor becomes higher.

19. The power conversion device according to claim 1,
wherein the drive motor includes a first drive motor and a second drive motor,
wherein the inverter for the drive motor includes an inverter for the first drive motor, which is configured to control the first drive motor, and an inverter for the second drive motor, which is configured to control the second drive motor,
wherein the power conversion device further comprises a DCDC converter configured to raise a DC input voltage based on a voltage command value to generate an output voltage to be applied to both the inverter for the first drive motor and the inverter for the second drive motor by having a plurality of power semiconductor elements subjected to switching control, and
wherein each of the plurality of power semiconductor elements that form at least one of the inverter for the first drive motor, the inverter for the second drive motor, and the DCDC converter is formed of a wide band gap semiconductor.

20. The power conversion device according to claim 19,
wherein the carrier frequency setting unit is configured to set the carrier frequency so as to minimize a total loss obtained by adding a loss of the first drive motor, a loss of the inverter for the first drive motor, and a loss of the DCDC converter.

21. The power conversion device according to claim 19,
wherein the carrier frequency setting unit is configured to set the carrier frequency so as to minimize a total loss obtained by adding a loss of the second drive motor, a loss of the inverter for the second drive motor, and a loss of the DCDC converter.

22. The power conversion device according to claim 1, further comprising:
a power generation motor configured to generate power from output of an engine;
an inverter for the power generation motor, which is configured to control the power generation motor by having a plurality of power semiconductor elements subjected to switching control; and
a DCDC converter configured to raise a DC input voltage based on a voltage command value to generate an output voltage to be applied to both the inverter for the drive motor and the inverter for the power generation motor by having a plurality of power semiconductor elements subjected to switching control,
wherein each of the plurality of power semiconductor elements that form at least one of the inverter for the drive motor, the inverter for the power generation motor, and the DCDC converter is formed of a wide band gap semiconductor.

23. The power conversion device according to claim 22,
wherein the carrier frequency setting unit is configured to set the carrier frequency so as to minimize a total loss obtained by adding a loss of the power generation motor, a loss of the inverter for the power generation motor, and a loss of the DCDC converter.

24. The power conversion device according to claim 1,
wherein the drive motor includes a first drive motor and a second drive motor,
wherein the inverter for the drive motor includes an inverter for the first drive motor, which is configured to control the first drive motor, and an inverter for the second drive motor, which is configured to control the second drive motor,
wherein the power conversion device further comprises a DCDC converter configured to raise a DC input voltage based on a voltage command value to generate an output voltage to be applied to any one of the inverter for the first drive motor and the inverter for the second drive motor by having a plurality of power semiconductor elements subjected to switching control, and
wherein each of the plurality of power semiconductor elements that form at least one of the inverter for the first drive motor, the inverter for the second drive motor, and the DCDC converter is formed of a wide band gap semiconductor.

25. The power conversion device according to claim 1, further comprising:
a power generation motor configured to generate power from output of an engine;
an inverter for the power generation motor, which is configured to control the power generation motor by having a plurality of power semiconductor elements subjected to switching control; and
a DCDC converter configured to raise a DC input voltage based on a voltage command value to generate an output voltage to be applied to any one of the inverter for the drive motor and the inverter for the power generation motor by having a plurality of power semiconductor elements subjected to the switching control,
wherein each of the plurality of power semiconductor elements that form at least one of the inverter for the drive motor, the inverter for the power generation motor, and the DCDC converter is formed of a wide band gap semiconductor.

26. The power conversion device according to claim 1,
wherein the drive motor includes a first drive motor and a second drive motor,
wherein the inverter for the drive motor includes an inverter for the first drive motor, which is configured to control the first drive motor, and an inverter for the second drive motor, which is configured to control the second drive motor,
wherein the power conversion device further comprises:
a first DCDC converter configured to raise a DC input voltage based on a voltage command value to generate an output voltage to be applied to the inverter for the first drive motor by having a plurality of power semiconductor elements subjected to switching control; and
a second DCDC converter configured to raise a DC input voltage based on a voltage command value to generate an output voltage to be applied to the inverter for the second drive motor by having a plurality of power semiconductor elements subjected to switching control, and
wherein each of the plurality of power semiconductor elements that form at least one of the inverter for the first drive motor, the inverter for the second drive motor, the first DCDC converter, and the second DCDC converter is formed of a wide band gap semiconductor.

27. The power conversion device according to claim 1, further comprising:
- a power generation motor configured to generate power from output of an engine;
- an inverter for the power generation motor, which is configured to control the power generation motor by having a plurality of power semiconductor elements subjected to switching control;
- a first DCDC converter configured to raise a DC input voltage based on a voltage command value to generate an output voltage to be applied to the inverter for the drive motor by having a plurality of power semiconductor elements subjected to switching control; and
- a second DCDC converter configured to raise a DC input voltage based on a voltage command value to generate an output voltage to be applied to the inverter for the power generation motor by having a plurality of power semiconductor elements subjected to switching control,
- wherein each of the plurality of power semiconductor elements that form at least one of the inverter for the drive motor, the inverter for the power generation motor, the first DCDC converter, and the second DCDC converter is formed of a wide band gap semiconductor.

28. The power conversion device according to claim 27, wherein the carrier frequency setting unit is configured to set the carrier frequency so as to minimize a total loss obtained by adding a loss of the power generation motor, a loss of the inverter for the power generation motor, and a loss of the second DCDC converter.

29. The power conversion device according to claim 1, wherein the drive motor includes a double three-phase motor.

30. The power conversion device according to claim 1, further comprising:
- a motor rotation speed detection unit configured to detect a rotation speed of the drive motor,
- wherein the carrier frequency setting unit is configured to set the carrier frequency to a higher level as the rotation speed of the drive motor becomes higher.

31. The power conversion device according to claim 1, further comprising:
- a motor torque detection unit configured to detect a torque of the drive motor,
- wherein the carrier frequency setting unit is configured to set the carrier frequency to a higher level as the torque of the drive motor becomes higher.

* * * * *